Inventors
JOHN H. ANDREAE
PETER L. JOYCE
By Percy P. Lantry
Attorney

Inventors
JOHN H. ANDREAE
PETER L. JOYCE
By
Attorney

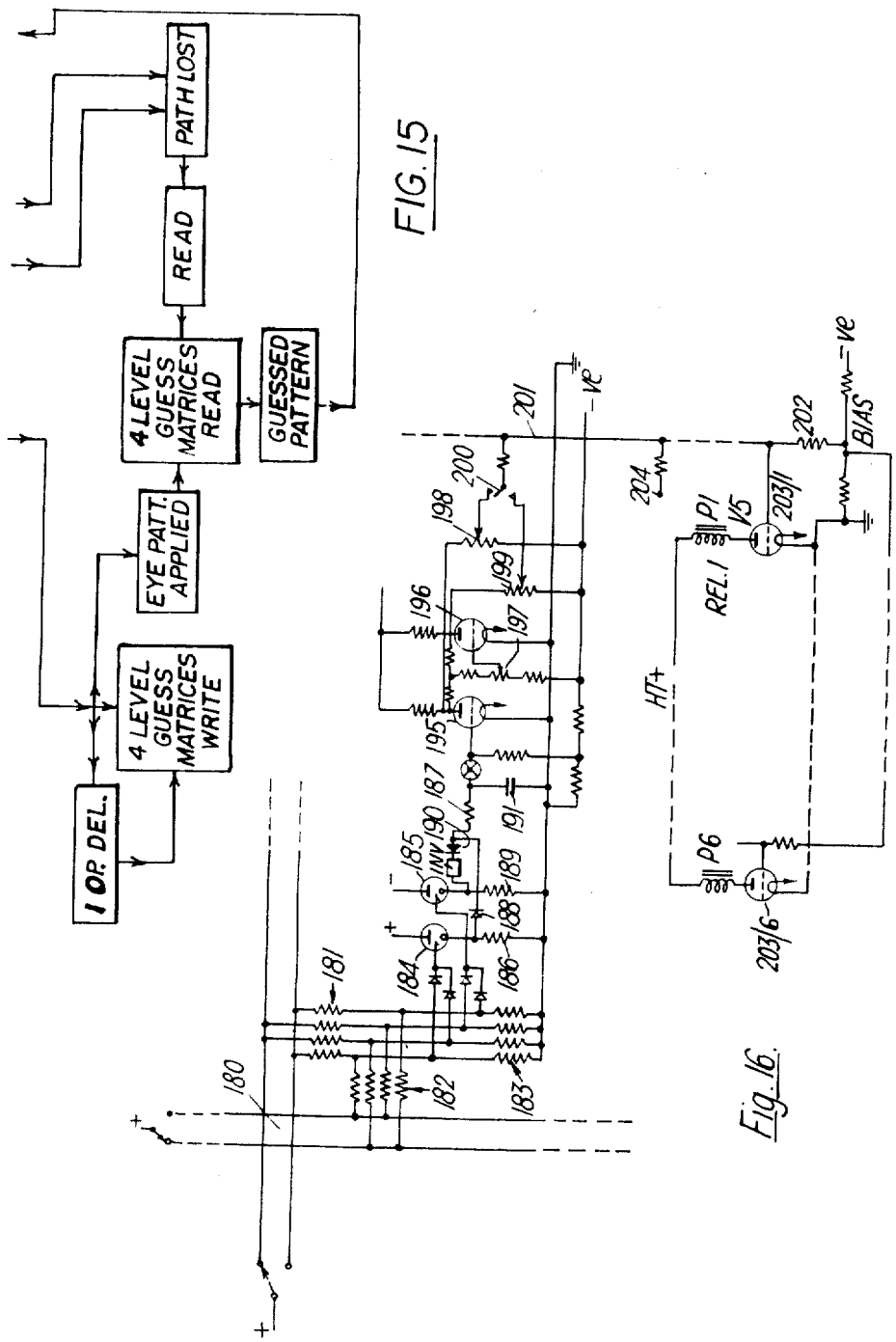

United States Patent Office 3,355,713
Patented Nov. 28, 1967

3,355,713
ELECTRONIC MACHINE SIMULATING A
LEARNING SCHEME
John Hugh Andreae and Peter Lawrence Joyce, London,
England, assignors to International Standard Electric
Corporation, New York, N.Y., a corporation of Delaware
Filed July 3, 1963, Ser. No. 292,541
Claims priority, application Great Britain, July 12, 1962,
26,835/62
19 Claims. (Cl. 340—172.5)

This invention relates to a so-called learning machine, i.e., to a machine which, when built or simulated, will exhibit that mode of behaviour which is commonly described as learning. The invention will be described with reference to an embodiment using electronic and mechanical techniques.

According to the present invention there is provided an electrical learning machine, which comprises output means which can generate any one of $n$ different output conditions each of which alters the machine's environment or its relation thereto, input means which obtains from said environment data words each relating thereto, a store with $n$ compartments each associated with a different one of said $n$ output conditions and each of which can contain a data word, a comparator for comparing a data word from said input means with the data words in said store and for selecting the stored word least like the word from said input means, control means responsive to the selection by said comparator of one of said recorded data words to cause said output means to generate the output condition corresponding to the compartment containing the selected word, and means for altering a word in said store after its selection so as to make it less unlike the word from said input device, whereby the machine can be caused to explore the environment.

According to the present invention there is also provided an electrical learning machine which comprises storage means for data collected relating to the machine's environment, which data includes information on the operations performed by the machine, means for receiving a signal (referred to as a reward signal) when the machine's operations are satisfactory, means whereby on reception of information relating to its environment a comparator compares that information with the data in said storage means and selects therefrom the stored data most nearly resembling the newly-received information and means responsive to such selection to cause the machine to perform the operation which it previously performed in response to the selected stored data, whereby the machine acts in a manner indicated by said stored information.

According to the present invention there is further provided an array of learning machines each as claimed in any one of claims 1 to 19, in which some at least of said machines operate in a master/slave relation, in which a slave machine collects data from its environment and from one or more master machines and influences its environment, and in which a master machine collects its data from a controlling input or inputs and from one or more slave machines and supplies controlling information to one or more slave machines.

The invention will be described with reference to the accompanying drawings.

INTRODUCTORY

A learning machine interacts with an environment. Thus, if it controls a chemical plant, the chemical plant is the environment. In a reading system the matter to be read is the environment, while in a control system for optimizing traffic flow, the traffic is the environment.

Whatever the environment, the learning machine has to receive through an input device, which corresponds to and is referred to herein as, an eye, adequate information of the state of the environment. For example, in a chemical plant, the "eye" receives information about temperatures, pressures, flow rates, pH values, concentrations, densities and so on which represent the state of the environment. Again, in a reading system, the "eye" is given an adequate representation of the matter to be read. Yet again, for a traffic control system, the "eye" receives an account of the positions and the velocities of all traffic. The last example illustrates the adequacy required for the input to the "eye." It would be adequate to anticipate collisions or traffic jams if the positions and speeds of vehicles were given, but not the directions of movement. The information received by the "eye" is presented as a finite set of values called the "eye pattern," which in the present case comprises six binary values.

Whatever the embodiment, the machine can interact with its environment. In the chemical control system, its output controls valves for the flow of chemical reactants, stop-cocks for applying heat to reactors, for introducing catalysts and so on. With the reading system, the output controls the scanning of the reading matter, and in the traffic control system, the output control provides the means for instructing and controlling the traffic.

The arrangement to be described is a self-propelled, self-steering vehicle moving on a level floor. It is about 18 inches long, 9 inches wide, 12 inches high, and runs on three wheels, two driven by a motor and clutch for forward and reverse motion, and the third being a non-driven steering wheel pivoted about a vertical axis through its diameter. To steer, the drive motor is coupled via another clutch to a gear wheel which rotates the steering wheel about its vertical axis. The environment is the floor on which are a number of walls of equal height, say six inches. There is no restriction as to the length, width, or cross-section of the walls so long as their sides are approximately vertical and are all of the same height. Along the top outside edge of each wall and for about an inch below the top edge, there is a strip of reflecting material which reflects most of the light impinging on it back towards the source of that light.

The eye has a set of photocells each with an opaque shield, and a directional light source. Each opaque shield restricts the light falling on its photocell to that reflected off objects, and in particular the walls, lying within a certain angle and within a certain distance of the machine. The photocells and their shields and sources are placed at appropriate positions around the machine according to what information about the environment the machine should receive. Each photocell output switches an associated relay or electronic switch from a state regarded as −1 to a state regarded as +1 when the light received by that photocell exceeds a certain threshold. The "visual" eye pattern is converted into a binary eye pattern for simplicity, since binary logic circuits are readily realized electronically, but analogue or continuous eye patterns can also be used. The eye is assumed to have six photocells, but at least eight would be preferred in many cases.

The motor output control is a system of relays and microswitches for driving the machine forward with the steering wheel parallel to the length, forward with the steering wheel directed to the left and at 45° to the length, forward with the steering wheel directed to the right and at 45° to the length, and in reverse with the steering wheel parallel to the length. These four movements are designated forward, left, right and reverse.

To produce responses to the environment, there are drives and rewards, whose natures are illustrated by a number of examples. In a chemical system, there might be different modes in which the plant can function, such as marking-time, part-capacity and full-capacity, which require the minimization of output, the maximization of efficiency, and the maximization of productive output respectively. For the control system to operate the chemical plant in these three modes, it must be given a drive, that is information about what mode is required, and a reward when the desired result is attained.

In a reading system the machine is a single level in a hierarchy of control levels. Thus if the object is to recognize letters and spaces in a printed line of type and to give this information to a higher level system which will recognize words from these letters, the higher level decides whether the letters it is receiving are acceptable for its word composition or not, and rewards the lower level accordingly. Also the higher level instructs the lower level to recognize the next letter, or to go back a few letters by giving the lower level an appropriate drive. In a traffic control system, the machine is given different drives under different situations as this informs it that a situation is different and that any reward received in this situation is not to be expected in other situations. Thus for controlling the traffic lights at a busy cross-roads in the suburbs of a large city, it will probably not be economically feasible to supply the system with sufficient information through the eye to enable it to observe the excessive build-up of traffic along the roads approaching the cross-roads during "rush-hours." Instead the system might be given a different drive during rush hours so that the learning and adaptation acquired during these periods is not confused with that acquired during other periods.

In the arrangement described reward can be given by an external agent pressing a reward button, or it can be given internally, for instance when the batteries are charged. Associated with these rewards are the two drives referred to as "pleasure-seeking" and "hunger." The goal of the device in the pleasure-seeking drive is to cause the reward button to be pressed; the goal of the device in the hunger drive is to cause the batteries to be charged.

In addition to the rewards and the associated drives, negative response or inhibition can be provided, as can the associated information called "pain." This is usually made to protect the system or to prevent it from performing undesirable actions, so inhibition is in continuous operation. Some inhibitory responses are built, but others are established as a result of pain information. Some of the complexities which inhibition and pain introduce to the system are illustrated by the following examples. In an air traffic control system, built-in inhibition can be used to prevent the system from performing actions which would allow two aircraft to approach each other closer than a minimum safe distance. If this does not cover all possible exigencies, additional provision is made for special detectors to convey pain warnings when local traffic density exceeds prescribed limits. In a chemical control system built-in inhibition may be used to avoid conditions known to be dangerous or ineffective, and pain warnings may be derived from prescribed limits to the rate of rise of temperature or pressure at certain places. In a reading system, pain warnings might be derived from malfunctioning of the device, imperfect characters, large blank spaces and the like. In the arrangement described certain regions of the environment are "out-of-bounds," and a pain warning occurs when the device enters such a region.

GENERAL DESCRIPTION OF FIGS. 1 TO 3

Having described the general properties of the eye, the eye pattern, the environment, the motor output control, the rewards, the drives, inhibition and pain, the machine will now be described in general terms, with a detailed description of the specific embodiment, reference to FIGS. 1, 2, 3 and 4.

The arrangement operates at either the search level or the reward level and there is also a correlation level which can augment the functioning of the other two levels. Operation at the search level uses an eye 1, a short term memory 2, a dissimilarity detector 4 and a continuous random improver of memory 3. The short term memory 2 has a row for each of the actions which can be performed by motor output control unit 5, in each of which a pattern is stored which can be compared with the eye pattern by the dissimilarity detector 4. The latter selects the row of the memory 2 containing the pattern *least similar* to the eye pattern, and causes the motor output to perform that row's action.

While the action is being performed, or if the action is obstructed during the attempt to perform it, the random improver 3 causes the pattern in the selected row to be made more similar to the eye pattern. The pattern in the row usually differs from the eye pattern in several respects, and randomness is introduced in the order in which these respects are dealt with. Because of the change in the eye pattern due to the action of the motor output control and the pattern changes by the random improver, the row first selected by the detector 4 ceases to have the least similar pattern to the current eye pattern, and the detector 4 selects a different row and a different action is performed by the motor-output control. If two rows have equally dissimilar patterns choice between them is on a random basis.

While operating in the search level the system explores the environment in such a way that there is a smaller probability for a repeated action to follow a particular eye pattern than for a new action to follow; that the system goes through its whole repertoire of actions to extract itself from a situation in which one or more of its actions are obstructed; and that there is little or no tendency for the system to perform repetitive cycles of actions.

The reward level uses a long term step (L.T.S.) memory 6, also known as the path memory, a threshold detector 7, a sequence store 10, a random selector 9, rewards, drives, pain and inhibition. Each row of the memory 6 is associated with a row of the sequence store 10, and each row of the memory 6 can hold an eye pattern and an action of the motor output control. In the corresponding row of the sequence store there can be recorded the information that the pattern and the action in the row of the path memory 6 were followed by the pattern and action in another row of the same memory, or were followed by the reception of reward. Each row of the L.T.S. memory has a weight associated with it which is increased when the row is used and which decreases with disuse. If an eye pattern followed by an action of the motor output control is termed a "step" then the memory 6 stores steps the system has performed, and the sequence store records the sequential relations which combine the steps into sequences or paths. Thus the L.T.S. memory and the sequence store provide a memory of paths which the system has followed previously and these are the paths which have resulted in the system receiving reward because additional steps are stored only as a result of reward.

The threshold detector, which is in essence a special form of comparator, selects those rows of the L.T.S. memory whose patterns have an equal or greater similarity to the eye pattern than the threshold of similarity. The random selector 9 chooses one of these rows on a random basis with each row weighted according to its weight and the length of the path (number of steps) between the row and an expected reward. The sequence store also contains a record of these steps which were followed by pain warnings and the choice of the random selector is biased against paths which could take the system into regions where pain warnings are expected. The threshold of the detector varies according to built-in-rules, two of which are considered to be of value. In the first, the threshold rises to a maximum (1:1 similarity) on each reward reception, and the threshold is allowed to decrease slowly and exponentially with time.

In the second the threshold is normally at a maximum and is reduced when the threshold detector fails to associate an eye pattern with any of the patterns in the L.T.S. memory 6. In both cases there is a minimum value below which the threshold cannot fall. With the first rule the system tends to follow accurately paths which frequently lead to reward, but tends to perform more arbitrary actions when reward is not achieved often, until perhaps as a result of these more arbitrary actions leading to the discovery of more rewarding paths, the threshold becomes maintained at a higher value. With the second rule, learned paths are followed precisely so long as the eye patterns seen are the same as those stored, and where the eye patterns are not identical to those stored the system attempts to see a structure in the eye pattern by reducing the threshold and allowing less precise association to be made with patterns in the L.T.S. memory. The second rule is of special value when two systems are operated as an hierarchial pair with the higher one accepting decisions from the lower one and rewarding acceptable decisions. Reduction of the threshold of the higher level can be used as an inverse measure of the acceptability of decisions from the lower level.

The correlation level uses a number of auto-correlation matrices each associated with one of the motor output control actions, there being the same number of matrices and actions. If the eye pattern is represented as an $n$-dimensional vector, giving the values of $n$ independent variables, an action by the motor output control is preceded by an eye pattern $n$-vector 1 and succeeded by an eye pattern $n$-vector 2. The product of these vectors is a matrix of values, whose elements determine the proportional increments to be made to the values of the elements of that action's matrix. After the performance of the action a large number of times the matrix therefore tends to an asymptotic form in which the invariant characteristics of how the action transforms the first eye pattern into the second eye pattern are preserved. These matrices, also called action matrices, can be used to predict the eye pattern likely to follow a particular action, the initial eye pattern being given. The prediction is inexact since it is based only on the invariants of the transformation represented by the action matrix. Thus the action "forward" causes the environment of the wheeled vehicle to pass it uniformly on either side and the corresponding action matrix should extract this invariant property of forward movement, but it cannot predict what new environment will come into the visual field of the photocells near the front of the device. In addition, an action matrix storing real values in its elements is inadequate for storing the complete amplitude and phase properties of a transformation; for example an action matrix stores the same increments for a pair of binary patterns before and after the action, as for the conjugate pair of those patterns in which each binary value is switched to its alternative state.

The correlation level augments the operation of the other two levels in two ways. In the first, it enables the system to choose actions which have a higher-than-chance probability of returning it to a step in the reward level when the threshold detector fails to associate the eye pattern with one of the patterns in the L.T.S. memory; and secondly it enables the system to explore the consequences of its future actions and to take anticipatory precautions. In the first case the eye pattern is transformed by any one of the action matrices, and if the transformed pattern, treated as an eye pattern in the reward level is associated by the threshold detector with a pattern in the L.T.S. memory, then the action for that action matrix is performed. If the transformed pattern is not so associated then each of the remaining action matrices is used to transform the eye pattern, in turn, until a transformed pattern is so associated. If no transformed pattern is so associated, the system reverts to the search level. Of course, the action corresponding to an action matrix which gives a transformed pattern associated by the threshold detector, might not lead to a new eye pattern also associated by the threshold detector with a pattern in the L.T.S. memory, but these should be a better-than-chance probability of this happening in a consistent environment.

The second manner in which the action matrices can be used is more complicated and depends on an internal mode of operation independent of the eye pattern, the actions of the system, and the environment. In this internal mode the motor output control selects action matrices instead of actions and the action matrices provide internal eye patterns instead of the eye patterns from the eye. The internal mode commences with a true eye pattern which is used by the dissimilarity detector or by the threshold detector to demand an action of the motor output control. The threshold detector always takes priority over the dissimilarity detector. The eye is switched off. Instead of performing the action demanded, the motor output control now selects the appropriate action matrix which transforms the eye pattern into a new internal eye pattern. This is dealt with by the dissimilarity detector or by the threshold detector, and the motor output control selects the next action matrix on the basis of the demands of these detectors, and the cycle of operation continues. In this mode the system is exploring the possibilities of its future movement by using the information in the action matrices and in the L.T.S. memory to anticipate the effects of those actions. If time is allotted during the performance of each action, or between actions for short excursions in the internal mode, and if some variation of the weights of rows in the L.T.S. memory is permitted when the internal mode excursions lead to steps which anticipate reward, then the internal mode allows the system to modify its actions as a result of its predictions.

The specific embodiment will now be described in more detail, and reference is now made to FIGS. 5 to 16 of the accompanying drawings; in which:

FIGS. 14 and 15 are flow diagrams, which when positioned together indicate the sequence of operations by the control circuitry; and FIG. 16 shows in more detail part of the circuitry shown in FIG. 3.

Figure 5:
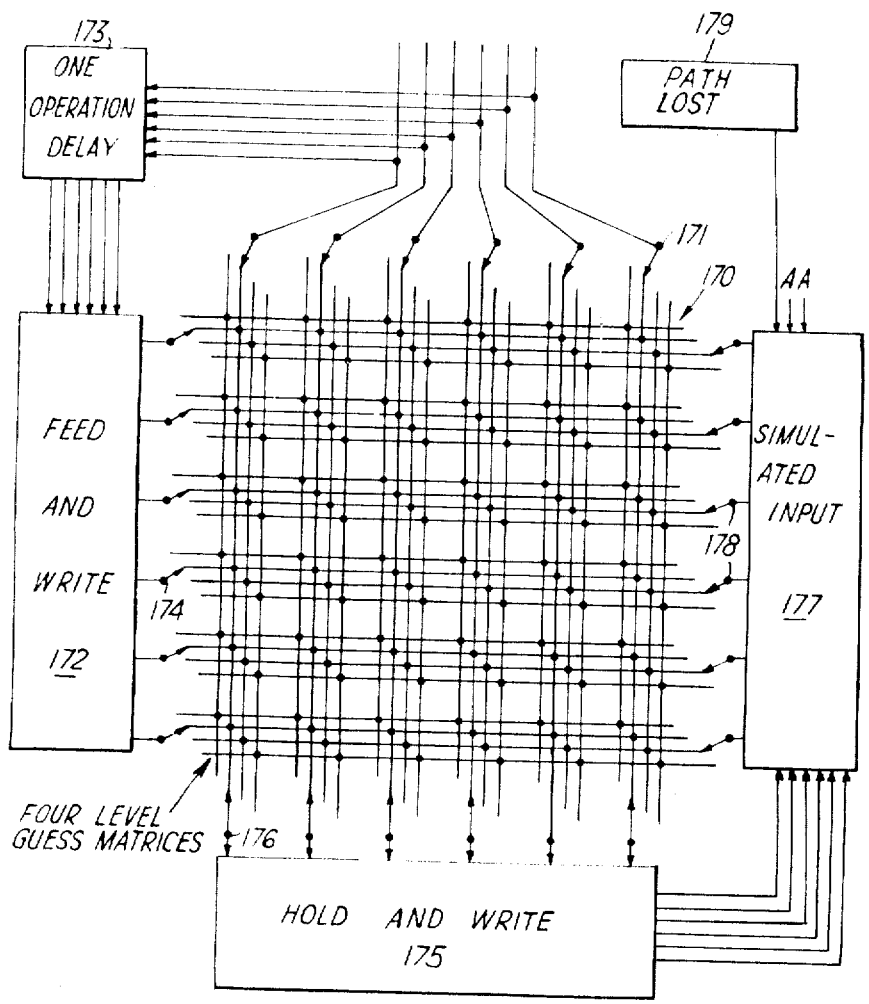
FIG. 5 illustrates part of the eye.

The eye (FIG. 5)

The eye 1 has six photocells at different parts of the device including its front, sides and back. The photocell outputs control the column conductors of the short term memory matrix 2. The photocell unit consists of a photo transistor 50 connected to an amplifier 51. Illumination of the photo transistor 50 increases current flow through its collector resistor 52, and the voltage change across the resistor 52 is amplified by the amplifier 51, and energizes relay A1 in the collector circuit of amplifier 51. The effect of further changes in the light intensity to the photo transistor 50 on the relay A1 is minimized by the rectifier across the relay which makes it slow to release. A thermistor 53 is provided to compensate for temperature variations.

The other five photocells of the eye are arranged in a similar manner to that shown in FIG. 5, control respective relays A2 to A6 (not shown). Each photo transistor has a threshold value and its relay is only to be energized when the light falling upon its photo transistor exceeds its threshold value. The relays A1 to A6 associated with the photocells of the eye will thus at any time be energized or de-energized to form a pattern representative of the environment viewed by the eye.

*Short term memory of search mode memory (FIG. 6)*

Figure 6:
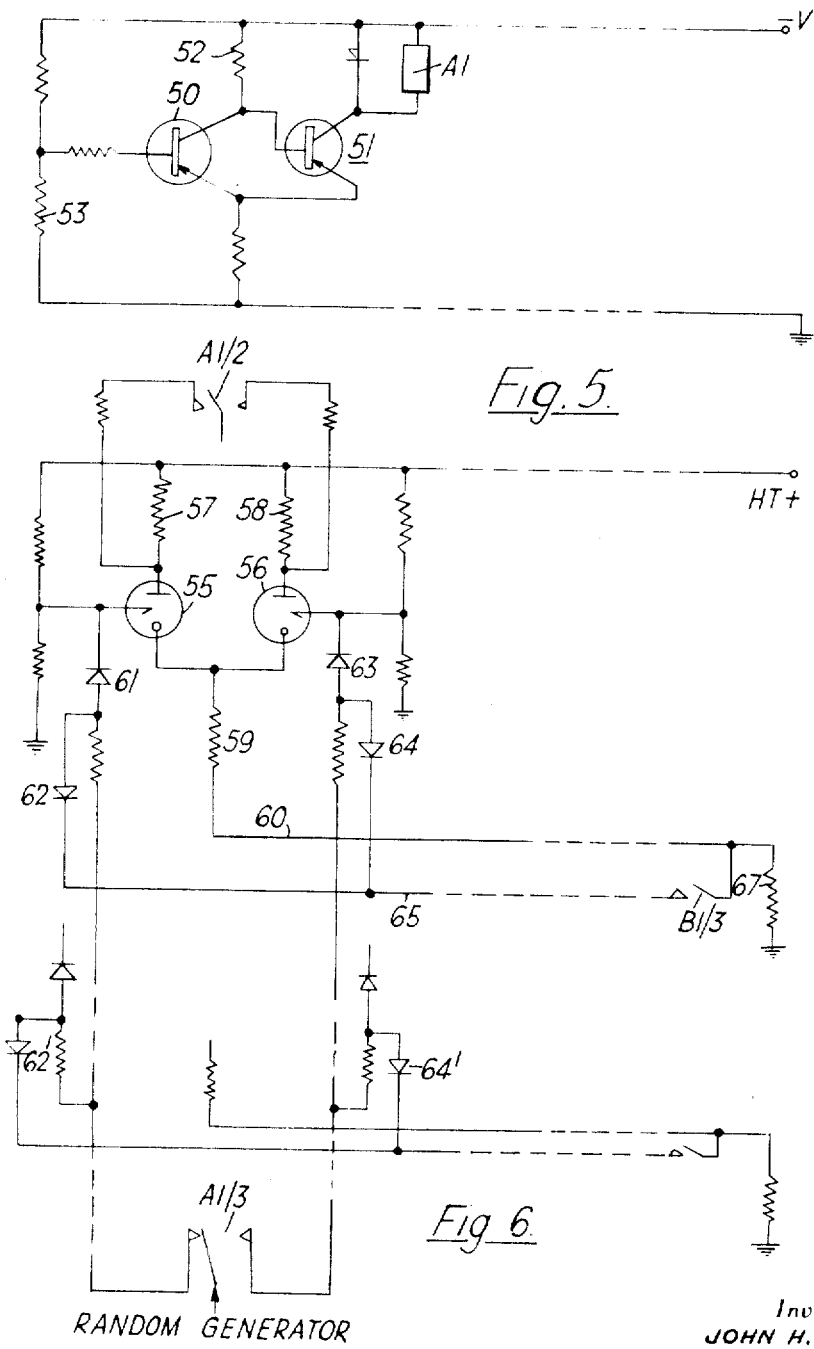
FIG. 6 illustrates part of the short term memory.

FIG. 6 shows in diagrammatic form one cross-point of the short term memory matrix 2. This comprises two trigger tubes 55 and 56 whose anodes are connected to H.T. positive through resistors 57 and 58 respectively, and whose cathodes are connected together and through a resistor 59 to conductor 60. Diodes 61 and 62 are associated with the control electrode of the tube 55, and diodes 63 and 64 with that of the tube 56, the diodes 62 and 64 being connected to a conductor 65. The movable contact of the change-over A1/2 is connected to positive, and the the stationary contacts thereof are connected via resistors to the anodes of the tubes 55 and 56. The movable contact of A1/3 is connected to a random generator in the improver 3 (FIG. 1), and the fixed contacts of A1/3 are connected via resistors to the diodes 61 and 63. The conductor 60 is connected to the other cross-point circuits in one row of the matrix 2, and the fixed contacts of A1/2 to the anodes of the other tubes of the same column. There are three other output conductors similar to the conductor 60 connected to the other three rows of the memory matrix 2.

The H.T.+ voltage is of such a value that one of the trigger tubes at each cross-point is self ignited. Initially one tube at each cross-point is ignited, in random manner. Once a tube at each cross-point, for example the tube 55 in FIG. 6, has fired, voltage developed across its cathode resistor (59) prevents self-ignition of the other of the two tubes (56).

Figure 7:
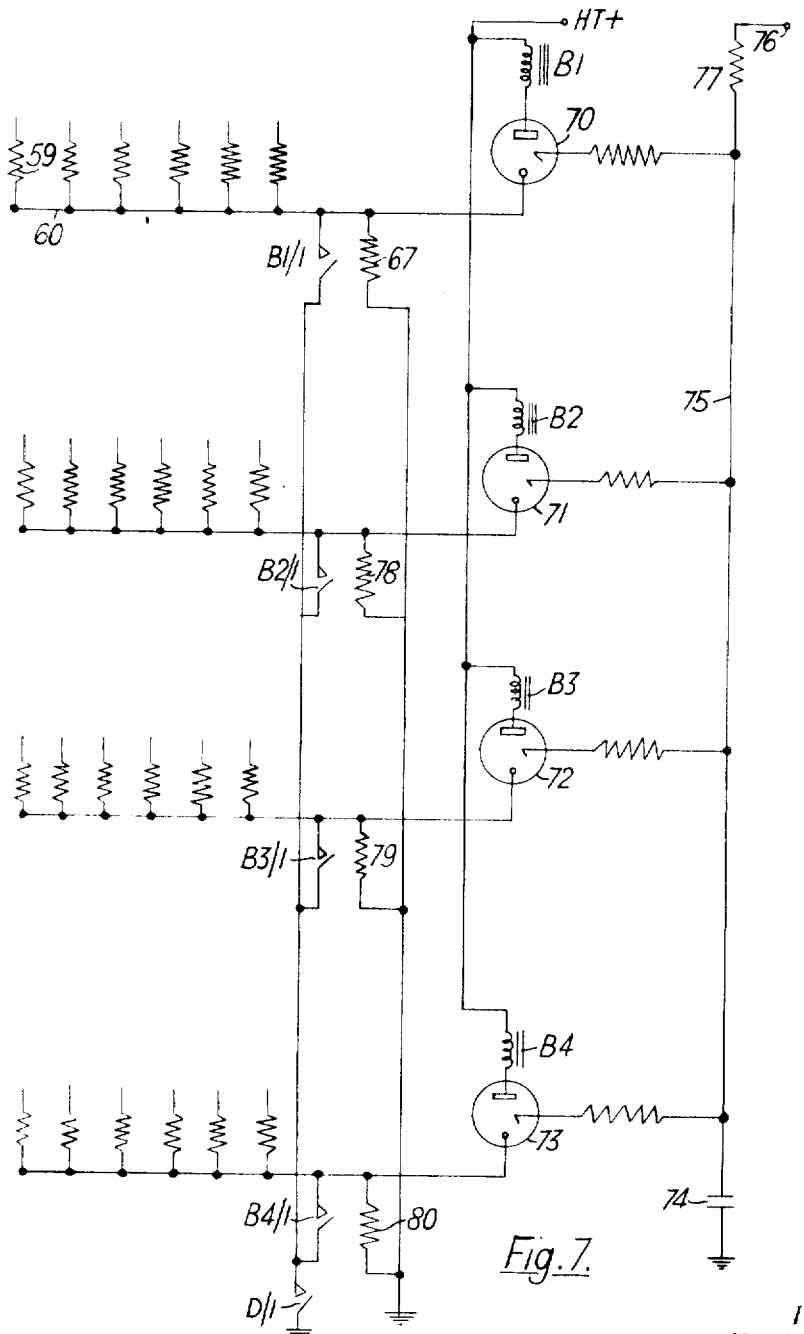
FIG. 7 illustrates the dissimilarity detector.

*Dissimilarity detector (FIGS. 7 and 8)*

This comprises four trigger tubes 70, 71, 72 and 73, one per row of the memory matrix 2. The row conductor 60 and the resistors 59 and 67, as described in connection with FIG. 6, illustrate how the cross-point circuits are connected to the detector 4. Resistors 78, 79 and 80 are similar to the resistor 67 and are connected to the second, third and fourth rows respectively of the matrix 2. A capacitor 74 is connected between earth and the trigger electrodes of the tubes 70 to 73 by conductor 75. A positive voltage at terminal 76 is applied to the conductor 75 through a resistor 77, and the capacitor 74 is charged.

The state of energization of the "eye" relays A1 to A6 determines the setting of the contacts A1/2 to A6/2 and thus the application of positive to the anodes of the trigger tubes of the cross-points of the matrix 2. If a cross-point is in its condition which corresponds to the condition of the associated A relay, then positive applied to the associated A relay contact causes an increase in the voltage across the respective cathode resistor. Such increases in voltage are summed by the respective resistors 67, 78, 79 and 80. If a cross-point is in a condition which does not correspond to that of the associated A relay, positive would be applied to the respective cut-off trigger tube and there would be no increase in voltage across the cathode resistor and hence no increase in the voltage across the respective resistor of 67, 78, 79 and 80. Thus, for example, the summation of the voltage across the resistor 59 and the other similar cathode resistors in the first row of the memory matrix 2 are developed across the resistor 67.

The tube of 70 to 73 with the lowest cathode voltage, developed across the resistors 67, 78, 79 or 80, is triggered by the voltage across capacitor 74. Thus the tube which triggers is connected to the row of the matrix 2 in which is stored the pattern most dissimilar to the pattern viewed by the eye at that time. Relays B1, B2, B3 and B4 are in the anode circuits of the tube of the detector 4, so the B relay appropriate to the selected row is energized. The contacts B1/1, B2/1, B3/1, B4/1 of these relays are connected between the row conductors of the matrix 2 and earth, via contacts D/1. Dependent upon which of the tubes 70 to 73 fires, one of the contacts B1/1 to B4/1 shorts out the one of the resistors 67, 78, 79, 80, thereby increasing the trigger cathode volts of the fired tube. On the original firing of one of the tubes, the voltage drop caused thereby across the resistor 77 prevents further charging of the capacitor 74, which prevents any other tubes from firing.

Figure 8:
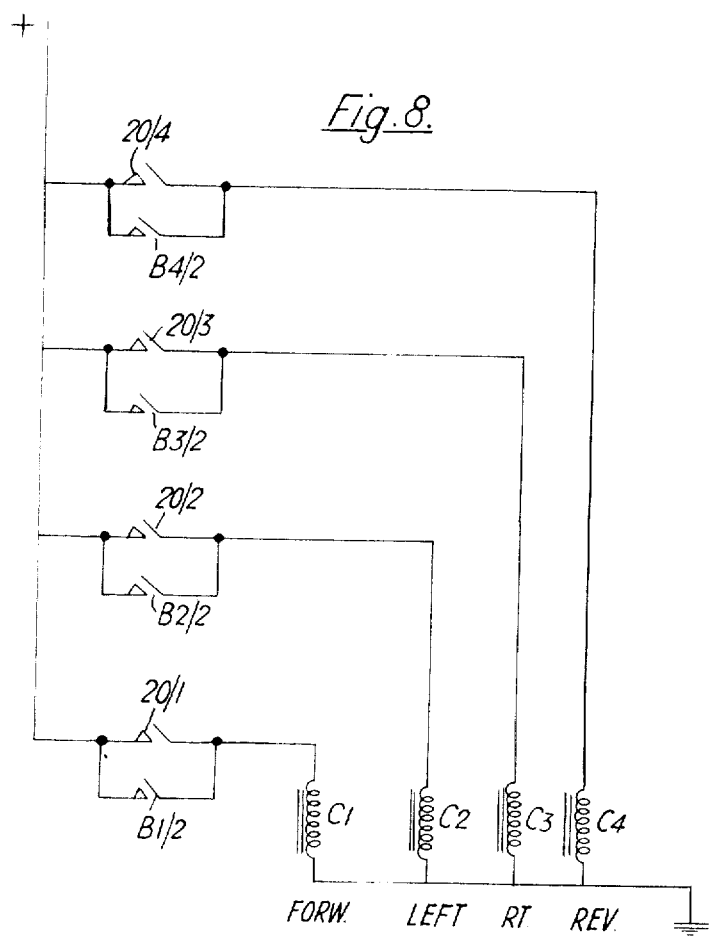
FIG. 8 illustrates part of the motor output control.

As shown in FIG. 8, a set of relays C1 to C4 is connected in parallel between a positive source and earth. One of the contacts B1/2, B2/2, B3/2, B4/2 is in series with each of the C relays between positive and earth so that energization of a B relay energizes a C relay.

The "teacher," designated 20 in FIG. 1, comprises a manually controlled device which can close any one of contacts 20/1, 20/2, 20/3, 20/4 each connected across a respective one of the contacts, B3/2, B2/2, B1/2, B4/2, so that the teacher can cause the operation of any one of the C relays, each of which (as will be seen later) controls one of the machine's movements.

Figure 9:
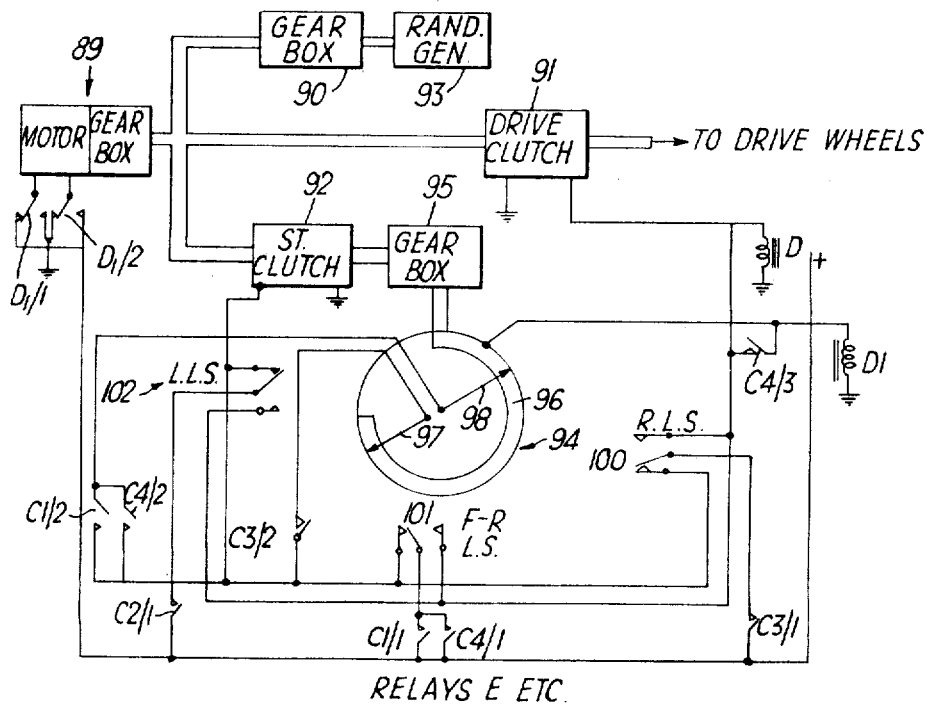
FIG. 9 illustrates another part of the motor output control.

*Motor control unit (FIG. 9)*

The motor output control unit 5 comprises a motor and gear box 89 coupled to gear box 90, drive clutch 91, and steering clutch 92. The gear box 90 drives a random generator 93 in the improver 3 (FIG. 1). The drive clutch 91 is connected to the drive wheels of the machine, and the steering clutch 92 is connected to a steering head 94 by a gear box 95. The steering head 94 has a contact strip 96 and two co-operating wipers 97 and 98. The strip 96 is earthed through a relay D1, and is also connected through contacts C4/3 of the reverse relay to the drive clutch 91 and to the right limit switch 100. The latter is connected to forward and reverse limit switch 101 and to left limit switch 102, the latter being connected to the steering clutch 92. The wiper 98 is connected to the limit switches by contacts C1/2 of the forward relay and C4/2 in parallel, and the wiper 97 is connected to the limit switches by contacts C3/2 of the right relay. Positive is applied to the limit switches 100, 101 and 102 by contacts C3/1, contacts C1/1 and C4/1, and contacts C2/1 of the left relay respectively, and the positive voltage is also connected to the motor 89 over contacts D1/1 and D1/2.

The steering head also has a disc supporting a freely rotatable steering wheel whose axle is fixed to the disc. This disc is driven from the gearbox 95, and has a small protuberance (not shown) on its periphery for engaging the limit switches. The limit switches are microswitches at 45° intervals about the disc, and are arranged to be operated by the protuberance on the peripheral portion of the steering disc as the latter rotates. The limit switch 101 serves as a forward and reverse limit switch, and normally has the forward contacts closed. Thus movement to the left indicates a forward movement at an angle of 45° and movement to the right is at an angle of 45°. Normally, the drive motor 90 turns the steering head 94 clockwise.

The device is moved in a direction dependent upon which is the most dissimilar selected row of the matrix 2. The relay C1 serves to drive the machine in forward relays C2 and C3 serve to drive it to the left and to the right respectively, and relay C4 serves to reverse its direction.

When relay C2 is energized, contacts C2/1 close and energize the steering clutch 92 through the normally closed contacts of the left limit switch 102. This turns the steering head 94 to the left until its disc's protuberance engages and operates the left limit switch 102 so that the positive is applied through contact C2/1 and the other contacts of the switch 102 to the drive clutch 91. Thus the machine is driven to the left.

When relay C3 is energized, contacts C3/1 and C3/2 are closed, and voltage is applied via C3/1, and the normally closed contacts of the right limit switch 100 to the steering clutch 92. Positive is also applied via C3/2, the wiper 97 and contact strip 96 of the steering head, to the relay D1, which operates and reverses its contacts D1/1 and D1/2 to reverse the direction of rotation of the motor 89. The steering head 94 is thus driven anticlockwise until it operates the right limit switch 100 and the positive is then applied via the contact C3/1 and the other contacts of the right limit switch 100 to the drive clutch 91. Thus the machine is driven to the right.

When relay C1 is energized, contacts C1/1 and C1/2 are closed. Positive is applied to the steering clutch 92 via the C1/1 and the normally closed contacts of the forward/reverse limit switch 101. If the machine had previously been turning to the left and the left limit switch 102 had moved to the condition in which the normally open contacts are closed, then voltage would be applied to the relay D1 via the contacts C1/1, limit switch 101, contacts C1/2, the wiper 98 of the steering head 94, and to the relay D1. The motor 89 is reversed due to the energization of D1 until the forward limit switch 101 is operated opening the normally closed contacts of the limit switch 101 and closing the normally open contacts, whereby voltage is applied to the drive clutch 91.

Assuming that the right limit switch 100 had previously been energized then the energization of the steering clutch 92 causes the motor 89 to drive the steering head until the forward limit switch is operated. Operation of the forward limit switch causes the drive clutch 91 to be operated in the manner previously described, causing forward motion of the machine.

When the relay C4 is operated, contacts C4/1, C4/2 cause the same sequence of operations to occur as when relay C1 operates, except that closure of the contacts C4/3 causes the relay D1 to be operated when the drive clutch is operated, whereby the drive motor is reversed and the device travels in a backward direction. Whenever any of the C relays operates it will be seen that the D relay operates to release the C relays, so that the dissimilarity detector can deal with a new pattern.

The dissimilarity detector 4 selects the row of the memory matrix 2 most dissimilar to the pattern seen by the eye. The improver 3 changes at random those elements in that row differ from the pattern seen by the eye. This changing is continued until the selected row ceases to be the least similar row to the eye input pattern, and the dissimilarity detector then selects a different row.

*Random improver*

Figure 1:
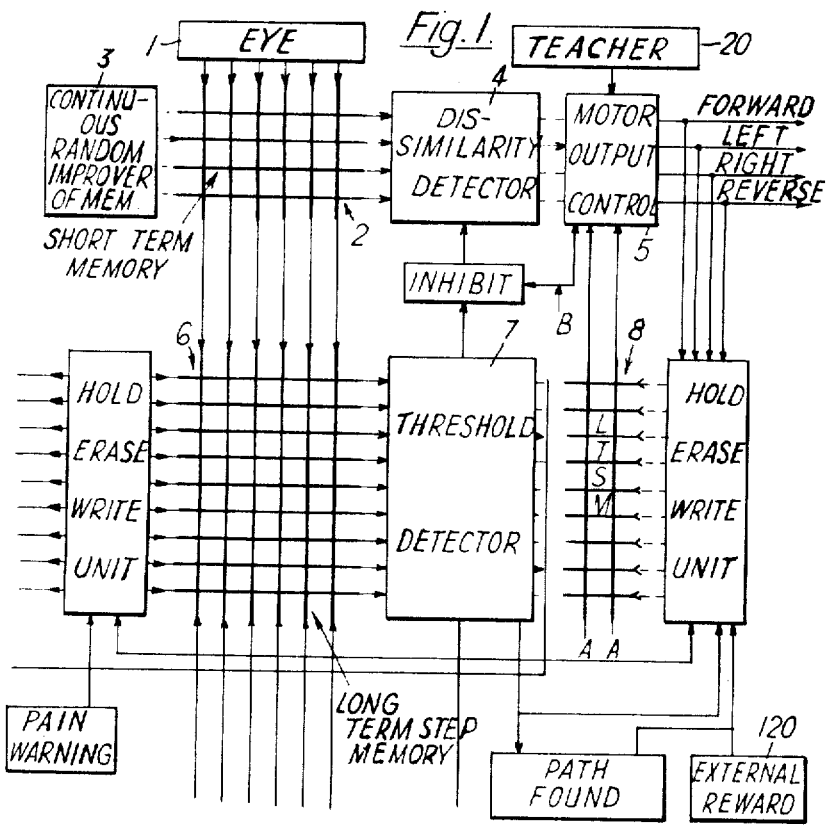

The random improver 3 is shown in FIG. 1 for convenience as being connected to the row conductors of the matrix 2. Actually there are six outputs from the improver 3, which are connected to the column conductors of the matrix 2 in the manner shown in FIG. 6. The random improver 3 includes a random generator with six outputs connected to respective column conductors of the matrix 2 by the contacts A1/3 to A6/3. One of these outputs is shown in FIG. 6 connected to the first column of the matrix 2.

The random improver can be a device operating in a manner similar to a roulette table. Its generator has a rotatable metal disc forming a base of a cylindrical tub with a stationary insulating wall, there being a ball-bearing in the tub which moves about in a random manner when the disc rotates. The base is connected to positive and terminals are positioned in the insulating wall so that they are connected intermittently and randomly to positive by the motions of the ball-bearing. Alternatively the wall can have pairs of terminals, the ball being able to connect the terminals of a pair. Six such terminals are connected to, and apply positive pulses in a random manner to, the column conductors of the matrix 2.

Assume that at a particular instant the first row is selected as that row of the matrix 2 having the least similar pattern to the eye input. Relay B1 is energized and its normally closed contacts B1/3 are open. Random positive trigger pulses are applied to all the six column conductors of the matrix 2, and these will only be applied to the selected row, namely the first row, since the other rows are shorted to earth via the normally closed contacts, B2/3, B3/3 and B4/3 and the diodes such as 62 and 64.

Further, assume that at the same instant the trigger tubes 55 and 56 are in a dissimilar condition to that of the relay A1, such that tube 55 is conducting and tube 56 is non-conducting whilst relay A1 is energized. The contacts A1/2 and A1/3 will be in the opposite condition from that shown in FIG. 6, and on a positive trigger pulse from the random generator, tube 56 fires. This causes an increased current in resistor 59, which increases the voltage drop there-across. The tube 55 now has insufficient volts to remain ionised and switches off. The tubes 55 and 56 are now in a condition similar to the pattern represented by the relay A1 and consequently the pattern viewed by the eye so that trigger pulses cannot have further effect on tubes 55 and 56 until relay A1 changes. It should be noted that the trigger pulse width should exceed the deionisation time of the tubes in the memory matrix 2.

*Control circuitry*

Figure 2:
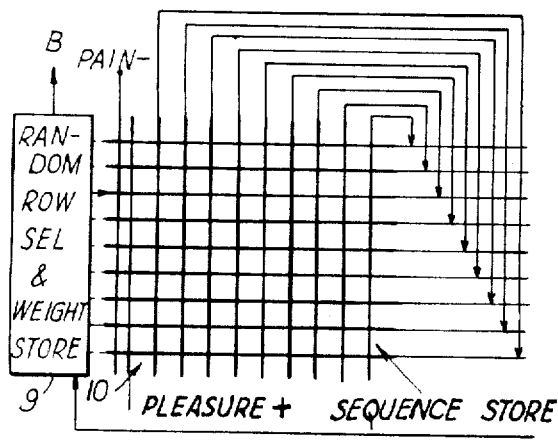
Figure 4:
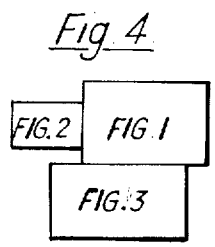

The next section of the control circuitry to be described includes the long term step memory 6; the threshold detector 7; the long term step memory motor output matrix 8; hold erase write units (which for convenience are shown as separate blocks in FIG. 1 but which actually form parts of other circuits); sequence store 10; random row selector and weight store 9; and other related parts shown in FIGS. 1 and 2. Certain parts in FIGS. 1 and 2 are shown as being physically connected to other parts, but such connections are shown merely for convenience. Information as to the state of a row or column of one part is transferred to the respective row or column of another part by closing or opening contacts of appropriate relays.

During each cycle of operation, while the control unit 5 is carrying out an output determined by the most dissimilar row, the eye pattern is temporarily held in the first empty row of the step memory 6, and the associated movement performed by the control unit 5 as a result of this pattern is held in the same row of the motor output matrix 8. These temporarily held patterns are not erased from the matrices 6 and 8 until, in the next cycle, the eye has seen and retained the next eye pattern and it has been determined whether it has any associated patterns already in the matrix 6. The latter has six column conductors each corresponding to a respective relay or other device in the eye circuit, and has *n* row conductors, FIGURE 1 showing nine for convenience. The row conductors of the matrix 6 are connected to the threshold detector 7, the long term step memory motor output matrix 8, the random row selector and weight store 9, and the sequence store 10 (FIG. 2), and related hold, erase, write units.

*Long term step memory or path memory (FIG. 10)*

Figure 10:
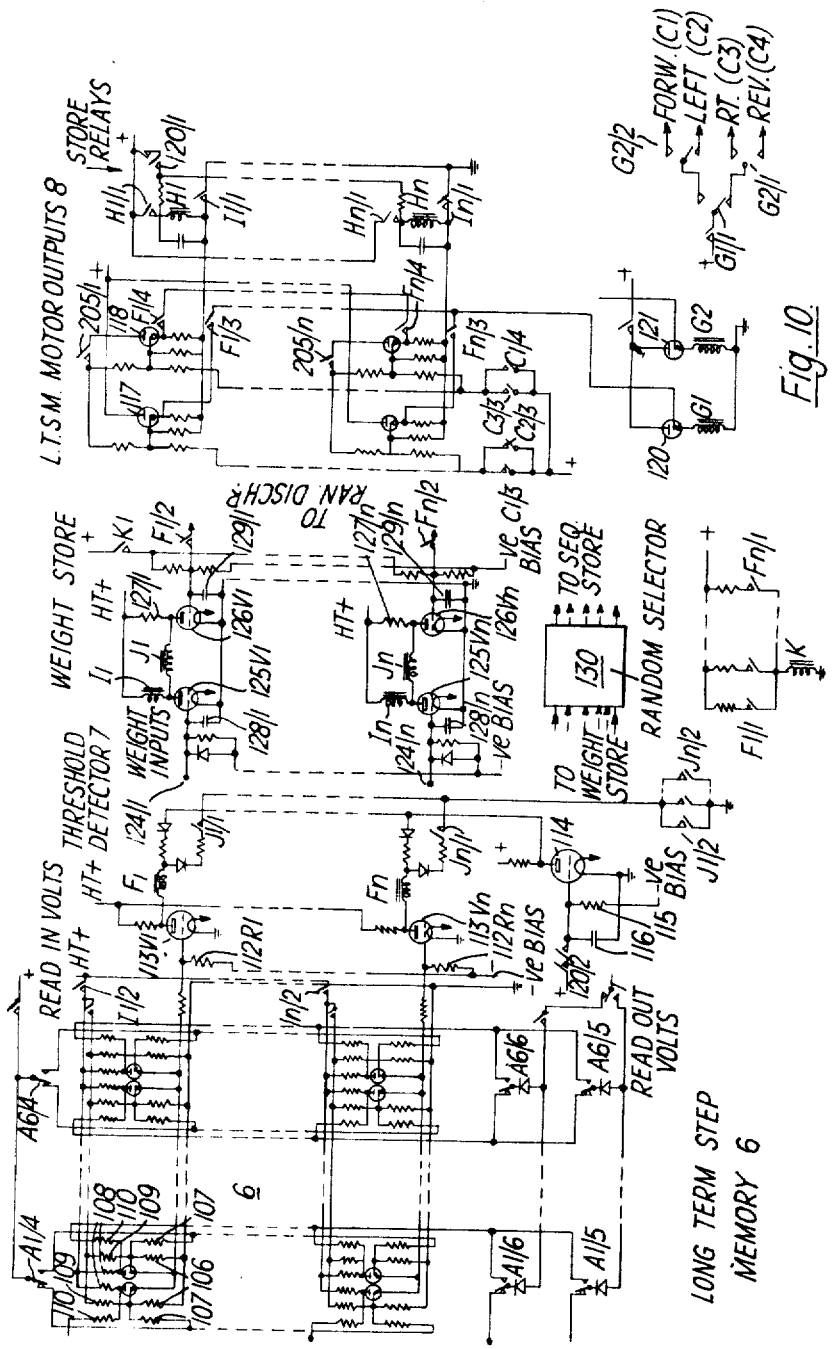
FIG. 10 shows in detail other parts of the circuitry shown in FIG. 1.

In FIG. 10 only the first and last cross-points in the first row, and the first and last cross-points in the last row of the matrix 6 are shown. As already mentioned there are six columns and *n* rows of such cross-points. Each cross-point comprises two trigger tubes whose cathodes connected together and to the other cathodes of the same respective row and the grids of the valves 113 V1 to 113 V*n*. Resistors 112 R1 to 112 R*n* are connected between negative bias and the grids of the valves 113 V1 to 113 V*n*. The control electrodes of each pair of trigger tubes are connected together via resistors, such as 106, and thence to earth, and are also connected to a source of positive read in volts via the respective contacts A1/4 to A6/4 and resistors such as 107. The anodes of each pair of tubes are connected together via resistors, such as 108, and to H.T. positive via respective contacts I1/2. Resistors, such as 109, are connected from the control electrodes of the tubes to H.T. positive through normally closed contacts. The anodes of the tubes are also connected via resistors, such as 110, through respective contacts A1/5 to A6/5 to a source of positive read out volts. The latter is also connected in a similar manner through contacts A1/6 to A6/6 by normally closed contacts of circuitry to be described in connection with FIG. 3.

To read-in or write a pattern into the matrix 6 positive is applied to the anodes of the tubes in a row of the matrix 6, the row being selected by the closure of one of the contacts I1/2 to I$n$/2. Read-in positive volts are also applied to the grids of the trigger tubes by the eye contacts A1/4 to A6/4. The positions of these contacts A1/4 to A6/4 depends on the pattern viewed by the eye, and determines which trigger tube in each particular cross-point in the selected row fires. Thus a pattern representative of the pattern viewed by the eye is held in a selected row of the matrix 6, this selected row being the first available row in the matrix.

For reading a pattern in any row of the matrix 6 read out volts are applied via resistors 110 to the respective anode of each pair of trigger tubes by the contacts A1/5 to A6/5. A comparison is thus effected between the condition of each eye contact A1/5 to A6/5 and the patterns stored in the rows of the matrix 6. If the eye pattern contacts are the same as that stored in a particular cross-point then there is an increase in the current through respective ones of the resistors 112 R1 to 112 R$n$, and the sum of the currents from each cross-point in each row will be summed in each respective one of these resistors 112 R1 to 112 R$n$. If the eye contacts are in the opposite condition to that stored at any cross-point, then there will be no increase in current across the respective resistors. The voltage developed across each of the resistors 112 R1 to 112 R$n$ is representative of the similarity between the patterns stored and the pattern viewed by the eye.

The valves 113 V1 to 113 V$n$ form part of the threshold detector 7 and are connected to respective rows of the matrix 6. The anodes of these valves are connected to H.T.+ and also through relays F1 to F$n$ to the anode of valve 114. Negative grid bias normally cuts off the valves, and the positive voltages developed across the resistors 112 R1 to 112 R$n$ reduces the bias voltage. Each anode voltage of the valves 113 V1 to 113 V$n$ is dependent upon the grid voltage and consequently upon the degree of similarity between the stored patterns and the eye pattern.

A positive source is connected to the anode of valve 114, a negative source to its grid via resistor 115, and a positive source voltage is also connected to the grid via normally open contacts 120/2 of reward button 120. The cathode of the valve 114 is earthed and a capacitor 116 is connected between its cathode and grid. When the contacts 120/2 are closed positive is applied momentarily to the capacitor 116, causing the valve to conduct, and the anode voltage to fall. This positive grid voltage decays slowly through the resistor 115 so that the anode voltage rises. The anode voltage at any time thus depends on the time since the contacts 120/2 were closed.

A relay of F1 to F$n$ will be energized when the voltage across it is greater than a certain predetermined voltage, which is selected so that at maximum threshold, i.e. at the time of a reward, only that stored pattern identical to the eye pattern causes the respective F relay to be energized. As the interval since the last depression of the reward button increases, however, several relays associated with stored patterns similar to but not identical with the eye pattern are energized. The significance of this will become apparent hereinafter.

*Motor output matrix*

Each row of the motor output matrix 8 comprises two trigger tubes such as 117, 118 of the first row. The anodes of the tubes are all directly connected to positive, which is also connected to the control electrodes of the tubes through normally open contacts. Normally open contacts C1/3 and C2/3 are in parallel between another positive source and the control electrode of one (117) of each pair of tubes, and normally open contacts C3/3 and C4/3 are in parallel between this positive source and the control electrode of the other (118) of each pair of tubes. Each tube has its cathode and control electrode connected through a resistor to its row conductor. These row conductors are connected to store relays H1 to H$n$, and to earth through normally open contacts I1/1 to I$n$/1. The cathodes of one (117) of each pair of tubes is also connected through normally open contacts F1/3 to F$n$/3 to the control electrodes of trigger tubes 120, and the cathode of the other (118) of each pair of tubes is also connected through normally open contacts F1/4 to F$n$/4 to the control electrodes of trigger tubes 121. The cathodes of the tubes 120 and 121 are earthed through relays G1 and G2 respectively, and the anodes are connected to positive through normally closed contacts 205/1 to 205/$n$.

To store information representative of the movement by the unit 5 simultaneously with the holding of the eye pattern in the matrix 6, one of the contacts I1/1 to I$n$/1 is closed so that the cathodes in its row of matrix 8 are earthed. To record a "forward" movement at the cross-point, both the contacts C1/3 and C1/4 are closed, triggering both the trigger tubes at that cross-point. For recording a movement to the "left," C2/3 alone closes and only the left hand tube of the cross-point is triggered, and when a movement to the "right" is to be recorded, C3/3 closes and only the right hand tube at the cross-point is triggered. For a "reverse" movement at the cross-point neither of the trigger tubes is triggered.

For reading-out information in any row of the matrix 8, the contact of 205/1 to 205/$n$ for that row closes to apply positive to the control electrodes of the two tubes, and the pair of contacts of F1/3, F1/4 to F$n$/3, F$n$/4 close. The voltage thus developed across the cathode resistor(s) of one or both tubes at the cross-point is applied to the tubes 120 and 121, energizing relay G1 or G2 or both relays. The manner in which the contacts of the relays G1 and G2 control the movement of the device is shown (at the right) in FIG. 10. Contacts G1/1; G2/1 and G2/2 are connected between a source of positive voltage and the relays C1, C2, C3, and C4 so that the device performs the indicated movement. Note that energization of neither G1 nor G2 represents reverse movement: if this use of no relays up is considered unsafe then the cross-point could have more than 4 stable states. For example, three tubes would allow of 8 stable states (including the "all off" state) so that in this case up to 7 possible output conditions could be catered for.

The rows of the matrix 8 are also connected to a positive source through respective ones of store relays H1 to H$n$ via contacts 120/1 of the reward button. Contacts H1/1 to H$n$/1 are connected between the positive voltage source and the relays H1 to H$n$ respectively to provide holding circuits for those relays.

Thus if, while a particular eye pattern, is in the matrix 6 and the associated movement pattern is in the matrix 8, the reward button is pressed, then the motor output which led to the reward and the eye pattern held in the matrices 8 and 6, are stored with unit weight in the row in which they were previously held. Closing the reward button 120 energizes the relay of H1 to H$n$ associated with the pattern receiving the reward.

*Weight store*

The weight store (FIG. 10) has $n$ rows each corresponding to a respective row of the matrix 6, and these rows have inputs 124/1 to 124/$n$ to which positive and negative weight pulses can be applied in a manner not shown. These inputs are connected to the grids of valves 125/V1 to 125/V$n$ and the anodes of these valves are connected to the anodes of valves 126 V1 to 126 Vn respectively through relays J1 to Jn respectively. The anodes of valves 125 V1 to 125 Vn are connected to H.T. positive through relays I1 to In respectively, and the anodes of valves 126 V1 to 126 Vn are also connected to H.T. positive through resistors 127/1 to 127/n respectively. The grids of valves 125 V1 to 125 Vn are connected to negative bias via resistors and diodes, and bias is applied to the grids of each of valves 126 V1 to 126 Vn through a potentiometer arrangement, including normally closed contacts K/1, between a positive source and a negative bias source. Capacitors 128/1 to 128/n extend between the grids and cathodes of 125 V1 to 125 Vn, and capacitors 129/1 to 129/n extend between the grids and cathodes of 126 V1 to 126 Vn. The cathodes of all the valves in the weight store are connected to earth. The grids of the valves 126 V1 to 126 Vn are connected to the n inputs of a random row selector or random discharger 130 via contacts F1/2 to Fn/2 respectively. The random row selector 130 provides in a random manner a connection between any one of the n inputs and the corresponding one of the n outputs of sequence store 10.

Contacts F1/1 to Fn/1 of the relays F1 to Fn respectively of the threshold detector 7 are connected in series with a relay K between a positive source and earth. Relay K is energized when two or more of the contacts F1/1 to Fn/1 are closed, and it opens contacts K/1 and removes the bias from the grids of the valves 126 V1 to 126 Vn. Energization of any one of relays F1 to Fn closes the respective one of contacts F1/2 to Fn/2, and respective ones of the capacitors 129/1 to 129/n are discharged via the random discharger 130 and the sequence store. Due to this discharge of the grids of these valves their anode voltages rise.

The current in the valves 125 V1 to 125 Vn is determined by the weights or positive charges stored on their capacitors 127/1 to 127/n, which thus determine their anode potentials. As will be more fully described hereinafter, the grid voltages of the valves 126 V1 to 126 Vn fall by randomly discharging through sequence paths in the sequence store, paths having shorter lengths causing the capacitors associated therewith to be discharged more quickly. When a sufficient potential difference exists between the respective anodes in each of the rows then the respective one of the relays J1 to Jn will operate causing the respective contact of J1/1 to Jn/1 to open and the respective contact of J1/2 to Jn/2 to close. Closure of any one of the contacts J1/2 to Jn/2 and the opening of one of the contacts J1/1 to Jn/1, applies earth potential to all of the relays F1 to Fn other than the one associated with a stored row thereby ensuring that only one of relays F1 to Fn is energized at a particular time.

*Sequence store*

Since each new pattern is stored in the first vacant row of the matrices 6 and 8, and since certain stored patterns are eventually erased, the sequence store 10 is provided to enable the control circuitry to determine the relationship or sequence between the various stored patterns. This store 10, see FIGS. 2, 11 and 12, has n rows and n columns and a reward column. This matrix is effectively in two parts, FIG. 11 being the first part which has relays LR at most intersections. There are $n-1$ relays in each row, the $n^2 - n$ relays being numbered consecutively. In the mth row the mth relay is omitted. Thus there is one relay per row omitted, these omitted relays being in a "diagonal" of the matrix. The second part of the matrix 10 is shown separately in FIG. 12 and it has a trigger tube at its cross-points which correspond to the cross-points in FIG. 10 which have relays. As indicated in FIG. 2 a path can be traced between each row and one or more other rows by the introduction of a resistor across the respective one or more cross-points.

Figure 11:
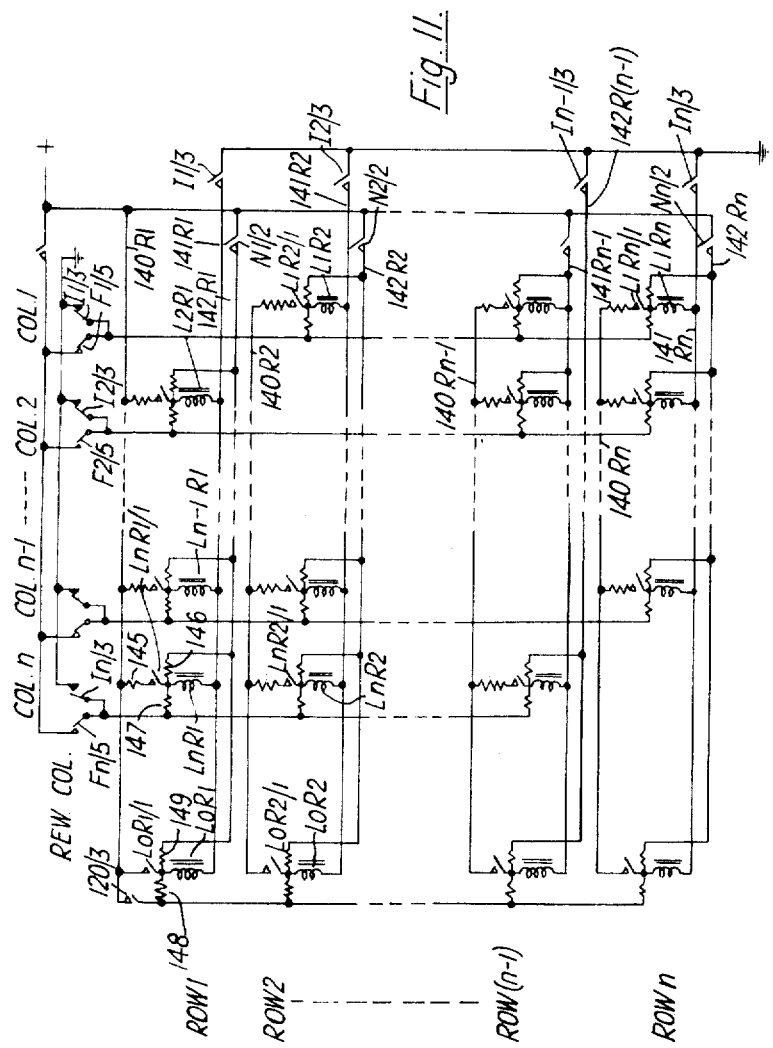
FIGS. 11 and 12 show in detail the sequence store.

Referring to FIG. 11, row conductor 140 R1 of the first row is connected to positive; row conductors 141 R1 to 141 Rn of the rows 1 to n respectively are earthed via contacts I1/3 to In/3 respectively; and row conductors 142 R1 to 142 Rn of the rows 1 to n respectively are connected to positive through contacts N1/2 to Nn/2 respectively of the previous row relays, hereinafter described. Row conductors 140 R2 to 140 Rn of the rows 2 to n, are not connected to positive as is row 140 R1, but are connected to the respective column and row conductors.

The manner in which the rows and column conductors are inter-connected is the same at each cross-point, and thus only one cross-point, namely that between the nth column and the first row will be described. Relay LnR1 contacts LnR1/1 and resistor 145 are connected in series between the row conductors 140 and 141 R1; and the junction between the relay and its contacts is connected to row conductor 142 R1 via resistor 146 and to the nth column conductor via resistor 147.

The reward column is connected to each row of the store 10 by respective cross-points. Only that connected between the reward column and the first row will be described since all are similar. The reward column conductor is connected to the positive source via normally open reward button contacts 120/3, and is also connected to the junction between the relay LoR1 and its contacts LoR1/1 via resistor 148. This junction is also connected to the row conductor 142 R1 via resistor 149.

Figure 12:
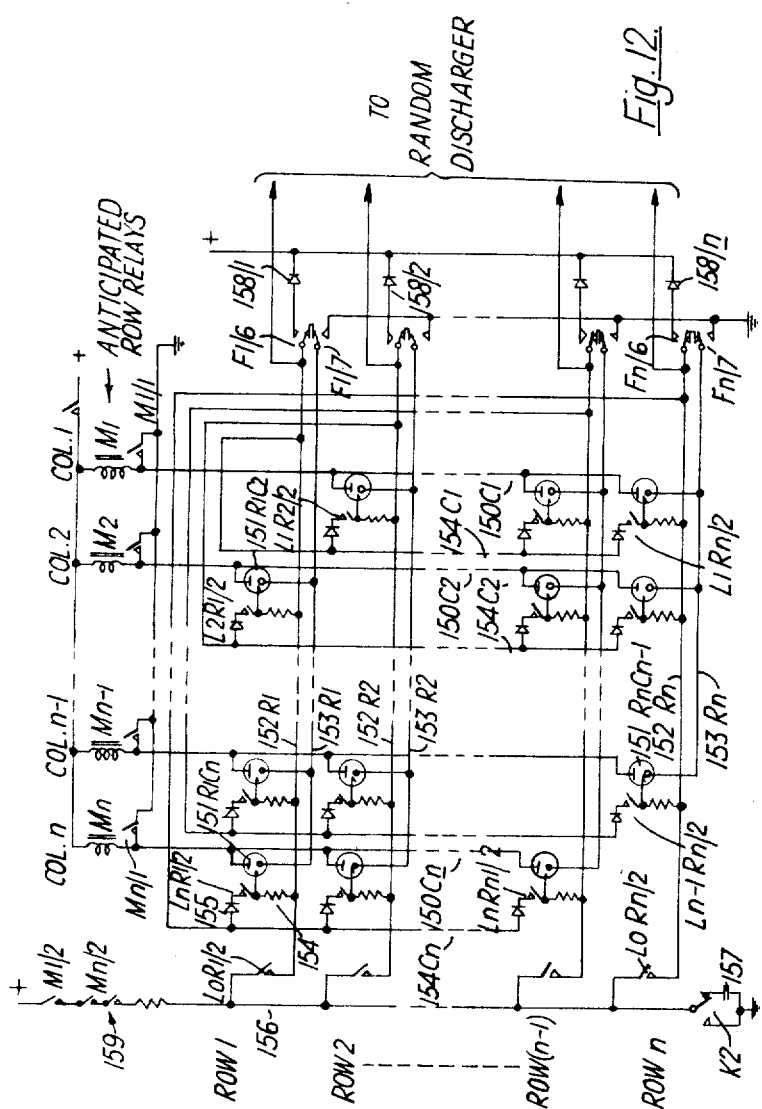

Referring to FIG. 12 the column conductors of columns 1 to n designated 150 C1 to 150 Cn respectively, are connected to positive through "anticipated row," relays M1 to Mn, and to earth through the normally open contacts M1/1 to Mn/1. These latter contacts also form holding circuits for the associated relays. The trigger tubes designated 151 R1C2 to 151 RnCn−1 according to their rows and columns have their anodes connected to the column conductors, and each row has two row conductors 152 R1 and 153 R1 to 152 Rn and 153 Rn. Additional column conductors 154 C1 to 154 Cn are provided to interconnect the rows and columns as indicated in FIG. 2. Conductor 154 C1 is connected to all the cross-points in the first column, and to the first row by connection to the row conductor 152 R1. Similarly the conductor 154 C2 is connected to all the cross-points in the second column and to the second row conductor 152 R2. The other additional column conductors are similarly connected. The conductors 152 and 153 of each row are normally shorted together through interconnected normally closed contacts F/6 and F/7, of which F1/6 to Fn/6 are connected to positive through diodes, F1/7 to Fn/7 being connected to earth. The row conductors 152 R1 to 152 Rn are also connected to the random selector or discharger 130.

The cross-points of the matrix shown in FIG. 12 are all similar and only the one for row 1 and column n of FIG. 11 will be described. The anode of its tube 151 R1Cn is connected to the column conductor 150 Cn, and the cathode is connected to the row conductor 153 R1. Conductor 152 R1 is connected via resistor 154 to the control electrode of the tube and the conductor 154 Cn through contacts LnR1/2, and diode 155.

The reward column conductor 156 is connected to positive through normally closed contacts M1/2 to Mn/2, and normally open contact 159, and is connected to contacts K/2. A capacitor 157 is connected to the normally closed contact of contacts K/2, and the normally open contact is connected to earth. The row conductors 152 R1 to 152 Rn are connected to the reward column conductor 156 via normally open contacts LoR1/2 to LoRn/2.

To store information at a cross-point of the sequence

15 store 10 such as that between the $n$th column and the 1st row the relay L$n$R1 is energized holds at L$n$R1/1. This relay can only be energized by the sum of the currents through the resistors 146 and 147 due to the closing of normally open contacts F$n$/5 and N1/2 and I1/3, and the opening of normally closed contacts I$n$/3. Energization of relay L$n$R1 closes contacts L$n$R1/1 to hold the relay, and closes contacts L$n$R1/2 to thus connect the resistor 154 between the row conductor 152 R1 and row conductor 152 R$n$ via column conductor 154 C$n$.

The relay L$n$R1 is released when the relay I$n$ in the weight store is no longer energized, which occurs when the weighting has been reduced to zero. This closes the contacts I$n$/3 and since resistor 147 has a lower resistance than the coil resistance of relay L$n$R1 the current through that relay falls below its holding current, and the relay de-energizes.

Figure 13:
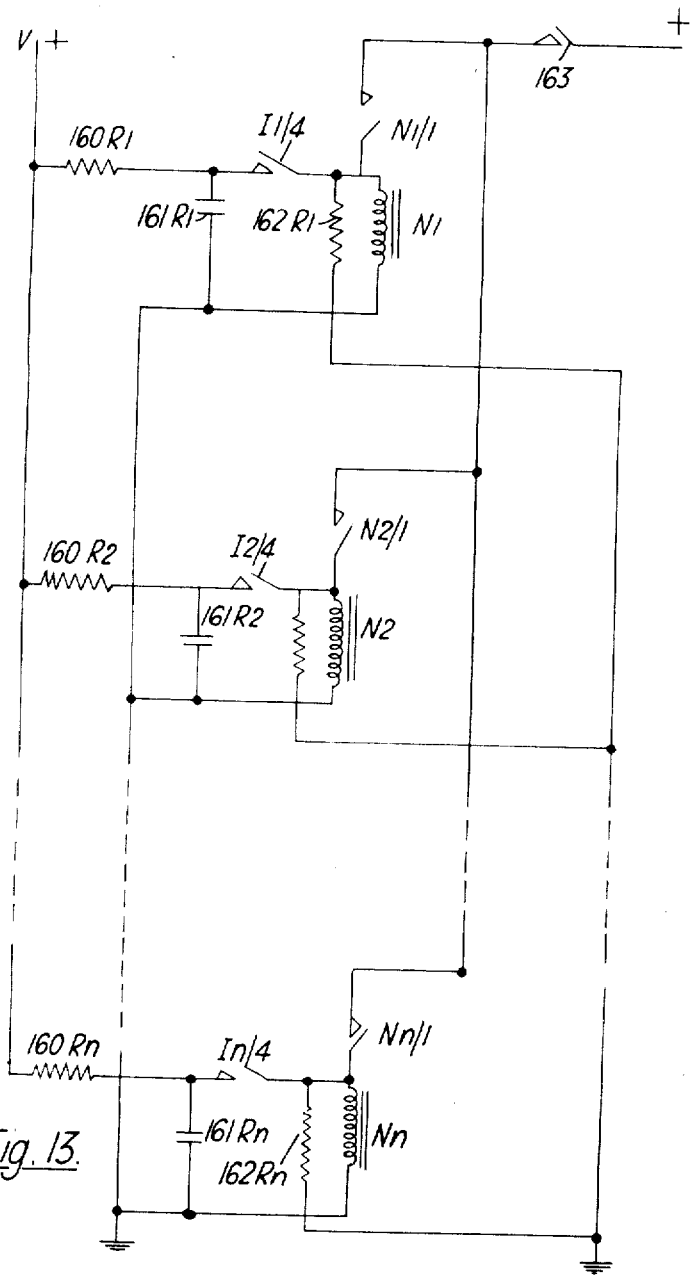
FIG. 13 shows the arrangement of previous row delays.

FIG. 13 shows how the "previous row" relays N1 to N$n$, each corresponding to a respective row of the matrix 6, are connected. One end of each relay is connected through a respective one of the contacts I1/4 to I$n$/4 and a resistor of 160 R1 to 160 R$n$ to a positive source. The other end of each relay is directly connected to earth. Capacitors 161 R1 to 161 R$n$ are connected between earth and respective ones of the connections between the resistors 160R and contacts I/4. Resistances 162 R1 to 162 R$n$ are connected across the relays N1 to N$n$ respectively. A holding circuit including normally closed "clear" contacts 163 is provided for each relay by respective ones of the contacts N1/1 to N$n$/1 connected between the relays and a positive voltage.

Assume that initially the relays N1 to N$n$ are all de-energized. When a pattern is held in the long-term memory matrix 6, one of the hold relay contacts I1/4 to I$n$/4 closes. Each of the capacitors 161 R1 to 161 R$n$ is normally positively charged, and when a hold relay contact I/4 closes, the charge from the associated capacitor energizes the respective relay of N1 to N$n$, the latter being held via its contact of N1/1 to N$n$/1. If the information in the row of the matrix 6 is not required, the hold relay de-energizes and the row is cleared. The "clear" contact 163 opens for a short time to release the energized one of the N relays.

When a pattern is stored in a row the appropriate hold relay contact I1/4 to I$n$/4 remains closed as long as the pattern is stored, and the previous row information is cleared by the clear contact 163. To ensure that hold contacts on a row in which a pattern is stored do not energize a previous row relay when the clear contact 163 closes, the ratio of resistors 160 to 162 is such that insufficient charge will be stored in the capacitor 161 to energize the relay under these conditions.

The arrangement of these "previous row" relays enables one to determine which is the row previous to any particular row in the matrix 6. Such an arrangement is necessary because the patterns can be fed into the matrix 6 randomly since the stored state of the matrix 6 is continually changing and the patterns are fed into the first empty or available row.

Figure 14:
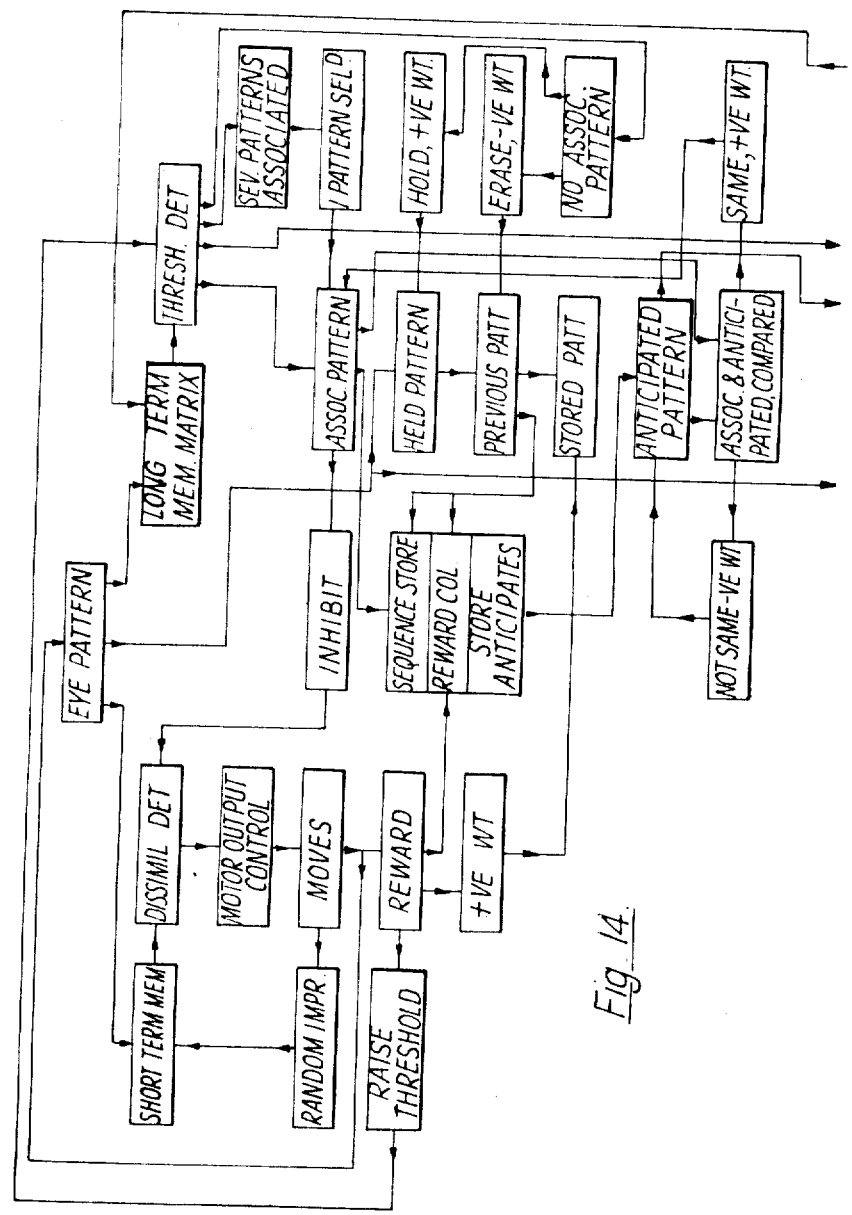

The manner of operation of the control circuitry described in connection with FIGS. 1, 2, and 4 to 12 will now be described in greater detail by considering a sequence of movements by the device, particular reference being made to the flow diagram of FIG. 14.

OPERATION

Assume that the device is operating in the normal "search" level as described with reference to FIGS. 5 to 9, and that no reward has been received. During each cycle, the pattern seen by the eye is temporarily held in the first vacant row of the matrix 6 and the movement output matrix 8. These patterns are removed at the end of the cycle, the first vacant flow being at this time the first row of these matrices. The devices carries on in this manner until the reward button 120 is pressed by an operator indicating that the device has moved into a reward area. The output which led to the reward and its initiating pattern are stored with unit weight in the first row of the matrices.

Reward level

Closure of the reward contacts firstly applied maximum positive voltage to the grid of valve 114 (FIG. 10), so that the threshold detector 7 is now in a condition of maximum threshold and only relay F1 is energized. Secondly, closure of the reward contacts causes a positive weight pulse to be applied to the grid of valve 125 V1 (FIG. 10), causing relay I1 to be energized thereby closing contacts I1/1. Closure of these contacts and the contacts 120/1 causes the relay H1 to be energized and to be held by contacts H1/1. Other contacts of the relay H1 are associated with the weight store in a manner not shown and serve to prevent clearance of the pattern now stored in the first row of the matrices 6 and 8. Thirdly, closure of the reward contacts 120/3, with closure of contacts I1/3 (FIG. 11) and closure of previous row contacts N1/2 energizes relay LoR1, this closing contacts LoR1/1 and LoR1/2. The closing of contacts LoR1/2 establishes and maintains a connection between the first row and the reward column. The device now reverts to the search level described with reference to FIGS. 5 to 9, except that the first available row of the matrices 6 and 8 will now be the 2nd row.

Every time the reward button is pressed a positive pulse is applied to the grid of the respective one of the valves 125 V1 to 125 V$n$, and is stored across the respective one of the capacitors 128/1 to 128/$n$ and consequently an increased positive voltage is built up across the respective capacitors every time the reward button is pressed. This voltage is referred to as the positive weight input to these valves. Additional positive weights are also given to these capacitors when certain stored patterns are recognized even if no reward is given. The resistors connected to the negative bias and to the grids of these valves slowly discharge these positive weights so that if a row is not used for a long period then the weight is considerably reduced. Ultimately this voltage will become ineffective and the valve will release the relay I and the stored pattern will be removed from the matrices 6 and 8. That is, the pattern/action pair and the reward are "forgotten."

The device proceeds until either it sees the pattern stored in the first row, namely the pattern leading to a reward, or it moves into another reward area and receives another reward. In the latter case the output which led to this next reward and its initiating pattern are stored with unit weight in the second row of the matrices, and the device reverts to the search level. In the former case, a positive weight is applied to the first row input 124/1 and the threshold detector holds the pattern and output which preceded the identification, and causes the motor output stored in row 1 of the matrix 8 to operate relays G1 and G2. These relays operate the device and at the same time normal movement under control of the dissimilarity detector is inhibited in a manner not shown, but indicated as "inhibit" in FIG. 14. If when the device moves it receives a reward, then the pattern and the associated output in the second row of the matrices is stored therein as a pattern leading to a reward. The store 10 serves to establish a connection to indicate that the pattern in the second row leads to the pattern in the first row, and this is done by energizing the relay L1R2 by the closure of contacts F1/5 and previous row contacts N2/2. This causes the resistor 154 at this cross-point to be connected between the second row and the first row by the contacts L1R2/2. The device now reverts to search behaviour. If when the device moves it does not receive a reward, the pattern in row 2 is removed and the device reverts to search behaviour.

Anticipation

The device now proceeds until it sees the pattern stored in the second row and the eye pattern and movement before this new eye pattern are held in the third row. The control circuitry is now considered to be in a condition of "anticipation" in which it is anticipated that the current eye pattern which is similar to the one in the second row will lead to the pattern in the first row. Thus the device performs the output associated with the pattern in the second row and at the same time the sequence store 10 is utilized to provide the anticipated row, namely the first row. This applies a positive weight to the store of the first row, namely to input 124/1 and capacitor 128/1. Either the output which the device performs as a result of the pattern stored in the second row of matrix 8 causes the eye to see the same pattern as is stored in the first row or not. If it does, when the device performs the operation in the first row of matrix 8 and an additional positive weight is applied to the capacitor 128/1. If the first row led to a reward, then the pattern held in the third row would be stored and would energize the respective relay in the sequence store 10 to establish the connection between the third and second rows. The device then reverts to search behaviour. If it does not see the same pattern, then the device does not perform the operation in the first row of matrix 8 and a negative weight is applied to input 124/1 and capacitor 128/1 to cancel the previously applied positive weight, the pattern held in the third row is cleared, and the device reverts to search behaviour.

If with the pattern in row 3, the movement of the device does not result in the eye pattern being the same as the anticipated row stored in the matrix 6, but the new eye pattern is the same as another pattern which is stored elsewhere in the matrix, then this pattern in row 3 is held for another cycle of operation and another resistance is inserted in the sequence store leading to this other pattern, and in this way it is possible to build up inter-related paths.

If an output in a sequence of operations leads to an immediate reward instead of to an anticipated row, then the row of the intermediate anticipated row has its weighing decreased by the application of a negative pulse, and the held row which started the sequence is stored with unit weight, and the device reverts to search behaviour. The device proceeds in this manner and a complex arrangement of patterns leading to rewards is stored in the matrices 6 and 8, even if there are several paths and if there are alternative outcomes to a particular pattern output combination.

The manner in which the circuitry anticipates that a certain anticipated row follows another row will now be described in greater detail. Assume firstly that the pattern is held in the third row, then the contacts F1/6 to Fn/6 and F1/7 to Fn/7 with the exception of contacts F3/6 and F3/7 are in their normally closed condition. The control electrodes of all the tubes 151 R3C in the third row are connected to the positive voltage, of say 50 volts via a diode. Contacts 159 close, as they do after each response of the threshold detector, and with contacts K/2 in the normally closed condition a rising voltage builds up across capacitor 157. Current thus flows from the reward column, through any closed reward contacts and through the sequence resistors 154 to the third row. The diode 158/3 passes no current towards the positive source until the voltage of the capacitor 157 exceeds +50 volts. Suppose that the trigger voltage of the tubes 151 RC is +55 volts, then as the rising voltage exceeds 50 volts current flows from the capacitor circuit thorugh the sequence resistors 154. When the sum of the voltage across the resistance of the reward column and the 50 volts exceeds the trigger voltage, the last tube in the sequence nearest to the third row fires. This causes an appropriate one of the M relays to operate and self-hold via contacts M/1, and at one of the M/2 contacts disconnects the capacitor 157 of the reward column from supply.

That path from the reward column to the third row having the smallest number of resistors 154 is the shortest path length and hence operates the respective trigger tube and its relay M. The raising of the row voltage to 55 volts achieves two purposes. Firstly the rising voltage across the capacitor is only required to develop a voltage of 5 volts across the resistance in the reward column. In the case of a long sequence path the sum of the voltage drops across the various resistors would require a very high voltage to be developed across the capacitor before the required 55 volts were reached. Secondly all the other tubes in the sequence are connected across each resistor, by cathode and control electrode, and only a small current is now required to flow through the resistor chain. There is thus no chance of the voltage developed across each resistor even approaching the trigger voltage.

Every time the operator presses the reward button a maximum positive voltage is applied to the grid of the valve 114 and the threshold is at a maximum positive value. With the maximum threshold, the threshold detector 7 only associates with the input eye pattern the row or rows of the matrix 6 containing an identical stored pattern. This maximum value is constantly discharging, however, via the resistor 115 and consequently the threshold value slowly and progressively decreases with time. As this value decreases, the detector 7 associates with the input pattern each row of the matrix 6 having a similarity with the input pattern exceeding the threshold value. Consequently as the period between rewards is increased, more and more rows will be associated with the detector 7. The random row selector 130, selects one of these rows on a probability basis, the probability of selection being higher for rows with greater weight and for rows exhibiting a shorter anticipated path to the reward. The latter is measured by the magnitude of the current flowing when the row in question is earthed with the reward column connected to H.T.+. Each resistance in the circuit between the respective row and the reward column represents one step in the path, and thus shorter paths would give a higher current. As the selector operates on a random basis, the probability of selection rows with lower weight and longer paths is small but not zero, and, since the similarity corresponding to a low threshold is not exact, the overall behaviour may be illogical and exploratory. Such behaviour, however, may enable the device to discover alternative paths and short cuts to a reward. The control of the threshold level by the reward enables the device to be able to continue to follow previously discovered successful paths.

When several patterns in the matrix 6 are associated with the eye pattern, several of the relays F1 to Fn operate so that relay K is energized. This establishes that one row should be selected from the several rows. Contacts K/1 in the weight store are normally closed, causing capacitors 129/1 to 129/n to be charged up, the weight inputs having no effect on this value. When relay K is energized contacts K/1 open and K/2 close thereby earthing the reward column. The contact 159 is open at this time, and disconnects the positive voltage source from the reward column. Respective ones of the contacts F1/2 to Fn/2 connect the associated rows of the weight store via the random selector 130 to the weight store 10. The capacitors of the associated rows are thus discharged to earth via the resistors connected to each row by the sequence store 10. When there are several resistors connected to a row, thus indicating that this row will have to follow a sequence of several rows before reaching a reward, this will tend to provide a slight discharge of the associated capacitor. When there is only a small number of resistors connected between an associated row and the earthed reward column, thus indicating that this row is near to a reward condition, then the discharge of the associated capacitor will be greater.

One of the associated rows is selected in accordance with which one of the J relays is energized. This happens when there is a maximum voltage difference across the ends of the relay, namely with the anode voltage of the respective valve 125 at a minimum and with the anode voltage of the valve 126 at a maximum. Thus the row having a compromise between maximum weighting and shortest route to reward, is selected by the energization of its J relay J. The random selector 130 gives the selection a certain degree of randomness in its behaviour so that there is a possibility of other paths being examined. This enables the device to discover possible short cuts and alternative routes to a reward, which would otherwise not have been selected.

The removal of those patterns from the matrices which are little used, and are therefore less useful, in order to make room for more important steps is effected by the slow time decay of the capacitors 128/1 to 128/n of the weight store. When a weight falls to zero, the contents of the row are erased and all connections to and from it in the sequence store are broken.

*Pain*

To introduce the feature "pain" into the control circuitry certain permanent features (not shown) are built in. The avoidance of a step towards pain is successful when the step has not been performed and the maintenance of pain reflexes cannot be achieved solely by experience. Naturally a control system could not be allowed to maintain a safe distance of approach between vehicles by experimenting with unsafe distances. The feature "pain" can be introduced by a column in the sequence store similar to the reward column, but connected to a negative potential so that currents measured by the random row selector 130 for shortest path detection, flow in an opposite direction from the pain column and act as inhibitory currents. When, for a particular row, the "pain" current exceeds the "reward" current, the output prescribed in the long term memory for that row is inhibited in the motor output control and the dissimilarity detector 4 is freed to choose another one of the outputs.

Allowance must also be made in the long term memory matrix and FIG. 11 arrangement for rows connected to the "pain" column in the sequence store. These rows must be given a permanent (non-decaying) weight since it is essential to have no forgetting in this respect. These rows would correspond to built in pain responses. Taught "pain" could be introduced by a "pain" button.

When the device encounters a built-in pain situation or an externally given pain warning, the previous step is remembered in the same way as for a reward path. In this instance, however, the sequences are built up to the pain column and the anticipatory currents are inhibitory. Any row corresponding to a pattern and output which leads to the pain warning is connected in the sequence store 10 to the pain column. The change from pain to no-pain can be treated as a reward and the appropriate row is connected to the reward column.

*Additional drives, etc.*

It is feasible to further include in the circuitry of the sequence store 10 additional columns, such as three extra reward columns which one might call "food," "fun," and "freedom" columns. The "food" column could be connected to the positive voltage only when the batteries were discharged, and this could also inhibit (disconnect) the "fun" column. "Fun" reward could be given by a button which could lead to a temporary disconnection of the "fun" column from positive voltage thereby giving a temporary satiation. The "freedom" reward column could be reserved for "pain" cessation and would only be connected when pain was experienced. This would inhibit the other two reward columns. At times, all three reward columns would be disconnected and the device could revert to the search level. The generation of new reward connections by the device is of considerable interest. Should, for instance, a heavily weighted row, which is disconnected from the subsequent path to the reward column by the erasure of the following row and sequence store cross-point resistor, be automatically connected to the "fun" reward column? A well-predicted sequence of events, initiated in response to an external reward stimulus, could then become a pleasure in its own right.

*Teaching*

In certain applications, teaching may be necessary to shorten the period of learning. For this purpose teacher 20 has a control which can be used by switches 20/1, 20/2, 20/3 and 20/4 (FIG. 8) to over-ride the motor output control unit 5. By using this, the teacher can lead the device away from pain areas, and show good routes to reward.

*Correlation level*

The construction and operation of the correlation level of the control circuitry will now be described. It represents an attempt to enable the circuitry to deduce the transformations which the movements of the device produce in the environment. This deduction is effected without any built in information about the nature of the environment. The previously described "levels of intelligence," i.e. the search level and the reward level, of the control circuitry have been concerned only with reactions to the environment and no attempt has been made to study the nature of the surroundings. The various processes introduced into the control circuit should be unspecific to the particular environment, for instance if one assumes the above described device environment, then one could clearly build into the control circuitry the means to map out this environment using one's own knowledge of the charicteristics of the environment. The circuitry would then be automatic but not self-organizing.

*Correlation level circuitry*

The circuitry representative of the correlation level is illustrated diagrammatically in FIG. 3 and comprises four analogue storage matrices designated generally at 170 which for convenience are shown one above the other but which could be side by side. There is one matrix for each movement of the device, namely forward, left, right and reverse. The column conductors are connected to the matrices 170 via the switches 171, and are also connected to a feed write unit 172 via an one operation delay network 173. The unit 172 is connected to the row conductors of the matrices 170 via switches 174. An eye pattern on the column conductors is applied to one of the matrices 170 selected according to the setting of the switches 171, and is also applied to the delay network 173, which delays it by one cycle. The movement by the device, i.e. the learning machine, due to the movement whose selection followed the eye pattern determines the setting of the switches 171 and 174. Consequently an eye pattern is fed to the row conductors of one of the matrices 170, and the eye pattern of the preceding cycle is fed to the column conductors of the same matrix, the latter being selected according to the device's movement due to that delayed eye pattern.

Each of the matrices 170 is an analogue store, and each cross-point in each matrix can store in a step by step manner the correlation between the eye patterns as a result of each movement; thus for any particular output the appropriate matrix has the initial eye pattern applied to its rows and the final pattern applied to its columns. So long as the output movement of the device has not been prevented by the external environment, each element or cross-point in the matrix has its value increased if its row and column have the same binary values, and has its value decreased if the respective row and column have opposite binary values. It is intended that the elements of the analogue matrices should saturate towards sufficiently large positive and negative values.

When the device has spent some considerable time searching the environment, the conditions of the matrices 170 represent the manner in which the movements of the device transform the observed environment. Whatever the nature of the environment, these matrices accumulate a kind of integrated picture of the invariant properties of the environment. Thus in the wheeled vehicle case one would expect the matrix corresponding to the forward movement to contain information that an observed pattern will move past the device from front to back. A hold and write unit 175 is connected to the column conductors via contacts 176 and is connected to simulated input unit 177 which in turn is connected to the row conductors 170 via contacts 178. The threshold detector 7 is connected to the simulated input unit 177 via path lost circuitry 179, and the simulated input unit 177 is also connected to the long term step memory meter output matrix 8 as indicated by connections AA.

The correlation level matrices 170 are used when the device loses its way on a remembered path in the reward level. If a remembered step or pattern in the memory 6 does not lead to another remembered step or alternatively to a reward, then the pattern then seen by the eye is applied to the rows of a randomly selected one of the matrices 170. This is effected via the path lost unit 179 and the simulated input 177, the switches 176 and 178 operating in a random manner. The randomly selected matrix transforms this input eye pattern into an output pattern as more fully described hereinafter, and this output pattern is delivered by the column conductors to the long term step memory matrix 6. The output for each column depends on the sum of the products of the input binary value and the value of the element in the column at each row, a positive sum giving a +1 output and a negative sum a −1 output. If this output pattern is associated by the threshold detector 7 with a pattern already in the long term matrix 6, then the output corresponding to this correlation matrix is performed. The weight of the row of the associated pattern in the long term matrix 6 is increased in anticipation, and this weight is stored or rejected according to whether the anticipated pattern is realized or not. If the output pattern from the correlation level matrix is not associated by the threshold detector 7 with a pattern stored in the matrix 6, then another one of the four matrices 170 is selected and tried. This is continued until an associated pattern has been found or all the matrices 170 have been tried and no associated pattern has been found.

FIG. 16 illustrates in detail a cross-point 180 of any one of the matrices 170, there being two row conductors and two column conductors at each cross-point, the conductors being connected to eye relay contacts as indicated in FIG. 16. The conductors at each cross-point are interconnected and earthed via resistors 181, 182 and 183. Voltage developed across two of the resistors 183 is applied to the control electrode of a trigger tube 184 and voltage developed across the other two is applied to the control electrode of another trigger tube 185. The anode of the trigger tube 184 is connected to positive, and the cathode is connected to earth via resistor 186 and to one end of another resistor 187 via a diode 188. Tube 185 is similar to tube 184 but its output is obtained via an inverter so that its output is a negative pulse, for "pain." A capacitor 191 is connected between the other end of the resistor 187 and earth.

Positive voltages are applied via the eye relay contacts to the cross-point 180 and, depending on whether the pattern elements are similar or dissimilar, develop a voltage across the first two or the second two resistors 183 respectively. The voltage across these resistors is applied via decoupling diodes to the tubes 184 and 185. When tube 184 is energized, positive voltage is developed across the cathode resistor 186, current is applied through diode 188, and capacitor 191 receives a charge for a short time. When dissimilar patterns are applied to the cross-point 180 the tube 185 is triggered and a negative charge is applied to the capacitor 191 due to the inverter INV.

If the capacitor 191 was previously positively charged, this negative charge discharges it. The capacitor 191 thus becomes charged asymptotically to reach saturation when the cathode voltage is reached.

The cross-point of FIG. 16 also includes a push-pull D.C. amplifier including valves 195 and 196 connected to the capacitor 191. The anodes of these valves are connected to H.T. positive, and the grid of valve 196 is connected to a potentiometer 197 which can be adjusted so that with normal bias on the grid of valve 195 the anode outputs of the valves are equal. Potentiometers 198 and 199 are connected between the anodes of valves 195 and 196 respectively and a source of negative bias. These can be adjusted so that with the normal bias on the grid of valve 195, the output volts of these valves with respect to earth is zero. The positive or negative charge on the capacitor 191 is measured by connection to the D.C. amplifier input. The anodes of the valves 195 and 196 will then swing positive and negative by equal amounts dependent upon the value of the input voltage. The potentiometers 198 and 199 are connected via contacts 200 to column conductor 201, the contacts 200 being controlled by the eye relays. The column conductor 201 is connected to a source of negative bias through a resistor 202, and is also connected to the grid of valve 203. The anode of the valve 203 is connected to a source of positive voltage through relay P1. FIG. 16 also indicates how the other cross-points associated with the column conductor of cross-point 180 are associated with the conductor 201, such as by the connection 204. Each of the column conductors in this matrix is similarly connected to a valve of 203/1 to 203/6, and an associated relay of P1 to P6.

The correlation level matrices are of use when the device loses its way on a remembered path, for example if it anticipates a certain pattern and this doesn't happen. The threshold detector 7 via the path lost arrangement 179 then operates the correlation level matrices 170. Thus if the device takes a step forward in anticipation that it would get a certain pattern, and in fact receives another pattern, this other pattern is applied by the contacts 178 (FIG. 3) to the rows of one of the four matrices selected at random. The contacts 178 select the respective matrix and the contacts 200 are set in accordance with this other pattern seen by the eye. The output in each column is summed across the resistor such as 202. The relays P1 to P6 are energized when the respective ones of the resistors 202 have a positive voltage thereacross and do not energize if a negative voltage is developed across these resistors.

The combination of the energization of the relays P1 to P6 provides the transformed eye pattern and the latter is applied to the long term memory matrix 6. The connection in FIGS. 1 and 3 is indicated for convenience as being by the column conductors as shown by the upwardly extending arrows in these figures. The connection between the matrices 170 and the matrix 6 is, in fact, via contacts such as contacts P1/1 to P6/1 of the relays P1 to P6. This output pattern from the matrices 170 is compared with the pattern in the matrix 6, and if a pattern is associated then the output corresponding to the correlation matrix in use is performed, but if there is no associated output the eye pattern is applied to another matrix of 170 and comparison is again tried with the stored patterns in the matrix 6. The matrices are tried in turn in this manner but if no output pattern is associated the device reverts to the search level of operation.

*Internal mode of operation*

If the eye 1 and the drive motor in the unit 5 are disconnected, and a single arbitrary pattern caused to appear at the input of the short term memory 2, then an internal mode of operation occurs. The initial pattern leads to the selection of an output by means of the dissimilarity detector 4 or the threshold detector 7, but this cannot be performed. It is however, used to determine which of the matrices 170 is used to transform the starting pattern into a second pattern. This second pattern is then similarly treated by the dissimilarity detector and threshold detector, and the respective one of the matrices 170 thus yields a third pattern, and so on. This internal mode of the control circuitry can lead through the random excursions of the dissimilarity detector and sometimes more logically by the threshold detector through the remembered paths of the long term memory to situations corresponding to pain and pleasure. It can be used by the control circuitry in a manner analogous to "thinking ahead." The control circuitry can thus be arranged so that while the device is performing a particular movement a period of prescribed duration could be reserved for this mode of operation. The implications at the internal mode of operation have been discussed hereinbefore.

BRIEF SUMMARY

From the preceding description it will be seen that the normal mode in which the learning machine, whether it is a wheeled vehicle or a process controller or some other control system, operates in the reward level, in which it follows paths of actions which it "knows" from previous experience lead to reward, i.e. to satisfactory result. This result is, of course, signalled to the machine either manually by an operator or automatically when the satisfactory result occurs. The search mode, in which operation is random or quasi-random, is only appropriate when the machine starts with empty memories or when it has completely "lost its way."

It is possible that while following the steps of a previously learned path, the machine might receive, in the case of the wheeled machine actually seen, a pattern which is not immediately recognized by the threshold detector, which when in the reward mode only responds when the eye pattern is *identical* to a stored pattern. When this occurs, there are two possible ways for recovery before the machine has to revert to the search level.

The first possibility is for the threshold of the threshold detector to be temporarily lowered by some small amount, e.g. the detector selects a stored pattern differing from an incident eye pattern in one bit place only. If the incident eye pattern is then recognized, the action of the machine is determined by the pattern action pair thus selected and the need for search action obviated. Thus lowering of the threshold ensures that the machine will not "lose its way" due to an excessively high threshold. As mentioned in the preceding detailed description, the raising of the threshold due to rewarded action increases the threshold but has the result that only absolute identity of received patterns with stored patterns can be effective. This absolute identity may in practice not always be attainable due to fluctuations in the environment analogous to (and referred to herein as) noise, and to minor error perturbations in the eye pattern. This difficulty is overcome by reducing the threshold temporarily, which would then allow the machine to keep to a learned path after a momentary "hesitation" due to the noise or perturbation.

After the threshold dropping procedure has failed the machine resorts to the internal model of the environment which has been built up in the stores forming the correlator. The eye pattern present after the failure of the threshold-dropping operation has failed is applied, together with one of the actions selected at random, to the correlator. For this purpose there is a store for each action and the eye pattern in question is applied to one of those stores at random. The correlator store then delivers an eye pattern which previous "experience," as represented by the state of that store, suggests should follow the incident eye pattern. This is offered to the threshold detector and if the latter associates the correlator's tentative eye pattern with a pattern in the long term memory, also known for obvious reasons as the path memory, then the action presented to the correlator (the action to which the randomly-selected store pertains) is performed. The reason behind this is that the correlator has shown that the tentative eye pattern can be expected to follow the incident eye pattern.

If the threshold detector fails to recognize the tentative eye pattern as one in the path memory, then another action is tried with the same incident eye pattern, in the example described by applying the incident eye pattern to the correlator store for that action. This is repeated for all actions, or a previously determined proportion of the actions, and if all actions are tried without avail the machine reverts to the search mode.

In the search mode each incident eye pattern is compared with a set of stored eye patterns, one per action, and the stored pattern least like the incident eye pattern selected by the dissimilarity detector. The action for this pattern is then performed. During the performance, the improver alters the selected pattern so that it more closely resembles the incident eye pattern which caused its selection. Hence a true searching action occurs until either new paths to rewards are established or until old ones are re-established. It will be recalled that an eye pattern whose action leads to reward is stored with that action in the path memory, as are eye pattern/action combinations leading towards rewards. As mentioned, where the dissimilarity detector and the threshold detector select different actions, the latter takes precedence over the former.

A final mode of operation described above in detail is the internal mode in which the correlator is used in a manner analogous to the exercise of foresight, i.e. the machine can make extrapolations into the likely future of its progress. For this an eye pattern selected during search operation or by the threshold detector or even by the agency of a human operator is applied to the correlator with a selected action—to a selected store in the example described. This produces a tentative eye pattern from the correlator which is treated by the remainder of the machine as a new eye pattern, conveniently called a pseudo-eye pattern, and an action selected as a result thereof. This second action is not, however, actually performed, but is applied, with the pseudo-eye pattern to the correlator and a further pseudo-eye pattern selected. This is also followed by selection of an action, and so on.

If this exploratory or "looking ahead" procedure causes the weights associated with paths leading to internal reward to be increased, the internal mode will have influenced the machine's actions on the basis of its own predictions. The significance of this is that where parallel paths exist, the exploration thereof during the internal mode will lead to differentiations therebetween, the paths' steps acquiring different weights.

Hierarchical arrangements such as mentioned above are used where the environment is so complex that the number of input channels needed for a useful eye pattern is too large for one learning machine. In such a case two or more subordinate machines each respond to part of the environment, and the results of their "studies" of the environment are submitted to the controlling or master machine. In this case reward and pain stimuli for the submachines are supplied by the master machine.

One example of an application of this hierarchical arrangement is for a reading machine in which the submachines might process letters into words and the master machine might process words into sentences.

In such schemes the master machine operates at a higher level than the other machines and it handles information which has already been processed.

Figure 17:
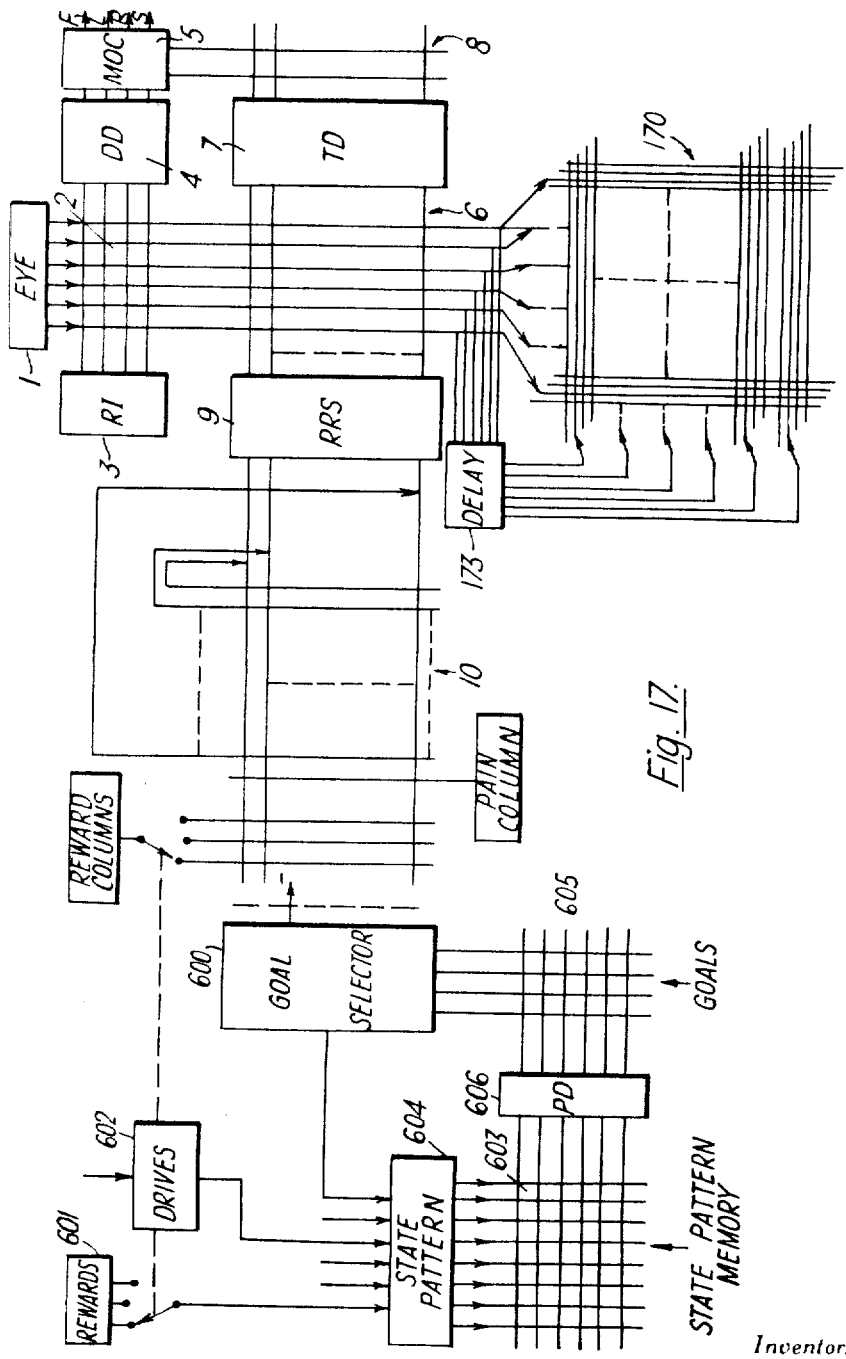

FIG. 17 is a complete schematic diagram of a learning machine such as described above and as shown in FIGS. 1 to 3, but somewhat simplified and with certain additional portions which will be described later. The wheeled vehicle to which the preceding description relates is assumed to have six eye inputs, but in actual fact may have a larger number, and eight is an especially convenient number for many practical applications.

Goal selection

In FIG. 17, additional portions of the drawing include three reward columns (this possibility has already been mentioned) which can each, like the pain columns, be connected to one of the rows of the sequence store. Each such connection between a reward column and a sequence-store row which has been established, either by built-in connections or due to the machines experience in its environment, is referred to as a goal, and the goal selector 600 allows the machine to select goals towards which it directs its energies, or to change its goals.

As an example of a goal, in a traffic control system heavy lorries heading north might be normally directed along road A, public transport vehicles heading north along road B, and private cars along road C. However, in certain cases the system might call for a different split between the types of vehicle, e.g. on the basis of speed or weight. This change of plan would be in effect a change of goal.

The unit 601 selects the reward towards which direction is desired while the box 602 causes selection of that reward's drive. In normal operation the reward and correlation parts of the system choose a new goal and modify the switching apparatus controlled by the units 601 and 602. This choice is made on the basis of a pattern of stored information, known as the state pattern, which is stored in a matrix store 603, the state pattern memory. The state patterns in the store 603 come from the state pattern control unit 604, which is analogous to an "inner eye" which in a simple system responds to certain specific data either supplied externally or from the rest of the machine. Some of the factors included in the state pattern are:

(i) The identity of the drive.

(ii) Whether a reward has just been received in that drive.

(iii) The fact that an anticipated reward did not occur.

(iv) The machine has just come out of the search mode.

(v) The level of the threshold applied by the threshold detector.

An advanced form of the state pattern might embrace all data in the sequence store and possibly also the path memory and the correlation matrices.

The various goals are stored in a further matrix 605, the goal store, and goal selection operation includes control by a pattern detector 606, whose co-operation with the memory 603 resembles the co-operation between the threshold detector TD and the path memory. In this case the incident data is a pattern obtained from the eye which corresponds to the current condition of the environment. Selection in this manner of a state pattern is used by the control circuitry to select the next goal to be aimed at.

Where hierarchical operation is employed the possibility of a large, and possibly unlimited, number of goal selection levels, one only being shown in FIG. 17, can be envisaged.

Alternative search procedure

The search procedure already described, which relies on the co-operation between the short term memory 2 and the dissimilarity detector 4 is only quasi-random by nature because it relies on comparisons between stored data and newly received data, and on alteration by the random improver 3 to the stored data. If a truly random procedure is considered more suitable, the units 1, 2 and 3 of FIGS. 1 or 17 could be replaced by a single random generator having a set of outputs one per possible output action. The generator is then arranged to energize these outputs one after the other in a random manner while the machine is in the search level.

This random generator can take any one of a number of forms, such as that already described using a tube containing a free ball.

Motor outputs

It will be noted that the motor outputs in FIG. 17 are labelled F, L, R and S, which are respectively forward, left, right and squeak. The latter replaces the reverse movement, and is effective when certain conditions occur in the machine as determined by the controlling operator. Thus the machine could emit a squeak—or other audible or visible signal—when (in the wheeled machine case) it "saw" a wall dead ahead. Forward is simple forward movement, and left and right can either be turn left and turn right while remaining stationary or true steering functions as already described. To put the machine into reverse, the number of turns to left or right appropriate for reversal is effected. This makes operation a bit cumbersome but leads to some circuit simplification.

Correlation

The following description relates to additional or alternative forms of correlation to what has already been described. The correlator already described in some detail is a so-called adaptive correlator, this meaning a correlator in which the designer has fixed the combinations of bits of an eye pattern, and also the actions, involved in the correlation, only the weights or probabilities being varied. In some cases, as in certain process controlling applications, the designer of the learning machine may have a complete and accurate knowledge of the environment in which the machine works. In such cases the machine can be provided with a fixed correlator. Such a device is, of course, much less flexible than the arrangement described, but in some cases its inherent simplicity may justify its use.

An extension of the idea of using a fixed correlator is to use a set of different fixed correlators, choice between them being either on a random basis, or determined with reference to the environment.

Where a correlator includes provision for altering the significance of one of its elements, in addition to or instead of, altering only the weights of the elements, the correlator is referred to as a growing correlator. From the description already given it will be apparent that a growing correlator has the following features:

(a) When in operation it correlates each digit of an eye pattern with every digit of the next received eye pattern. As already mentioned this is done by applying the first eye pattern to the rows of one of the matrices with a one cycle delay and applying the second eye pattern directly to the columns of the same matrix;

(b) If the weight of one element is low, this means in effect that the correlator is unable with much certainty to establish any correlation between the $x$th element of the first pattern and the $y$th element of the second pattern;

(c) Where the condition (b) exists, the weight of that element is changed, i.e. growing occurs, as a result of operation of a switch (for instance automatically) as a result of which a different eye pattern bit is applied to that element of the correlation matrix. This growing operation can be effected in a random manner or in accordance with a predetermined sequence.

Figure 18:
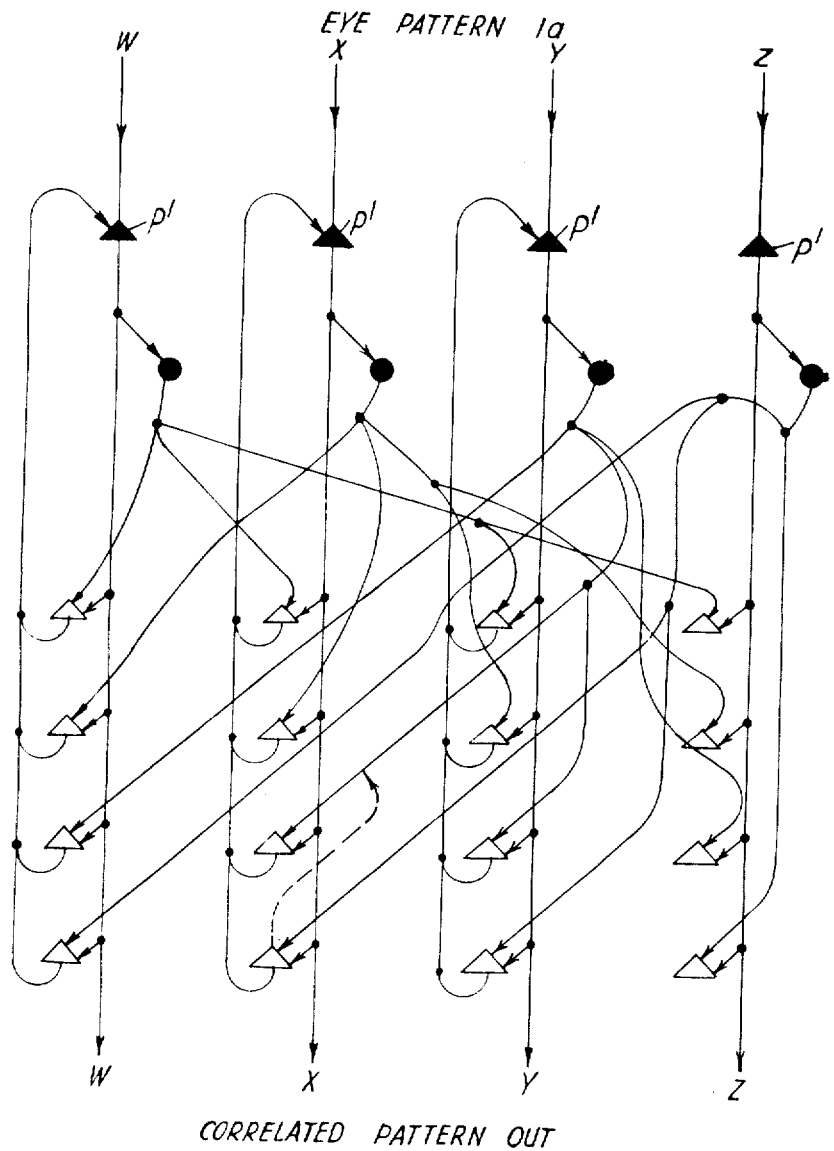

A growing correlator matrix can be produced using, instead of the techniques described above, a number of individual elements referred to as neurons. Each neuron is an electrical circuit analogue of a nerve cell, and such analogues are well known. The circuit of such a correlator is shown in FIG. 18, which for simplicity assumes a 4 x 4 matrix (although in the machine described the matrices would be 6 x 6). The matrix consists of the 16 neurons labelled IV, shown as open triangles each of which is fed directly from a neuron of layer II, shown as blackened triangles, and also via a neuron of layer III, shown as solid circles.

For each digit of the eye pattern which is 1, a burst of pulses is applied to the appropriate neuron of layer II via its column input wire W, X, Y or Z. This causes the layer II neuron to produce an output pulse burst if, and only if it receives another burst of pulses on its input $p^1$, which latter occurs when the actions determined by the pattern in question is about to be performed. Thus the layer II neurons are analogous functionally to AND gates.

When a layer II neuron operates, or fires to use the term currently in use, its output causes the layer III neuron connected to it to fire and give an output after a delay T which is one cycle time. The outputs from the layer III neurons are each applied, as shown in FIG. 17, to four layer IV neurons, each of which is connected directly to a different layer II neuron.

Thus when an eye pattern is received, with an indication that the corresponding action $P^1$ is about to be performed, that eye pattern is transferred to the layer III neurons to form the before-the-action pattern $E_p$. The eye pattern following the action arrives at the layer II neurons in due course. The action due to this new eye pattern, or a suitable signal from some other circuit element, causes the neurons to fire for these signals so that the layer IV neurons are stimulated by a delayed eye pattern and a new eye pattern. Any neuron in layer IV which receives at the same time stimuli from neurons of both layer II and layer III fires, and sends pulses back to its neuron of layer II so that the latter is held operable for any new incident eye patterns.

Weight changing is introduced into this arrangement by so designing the layer IV neurons that a neuron becomes easier to fire the more often it is fired, but the effect of one burst of firing pulses on facilitation of future firing decreases with time.

When pulses representing an eye pattern are applied to the layer II neurons with the pulses for a $P^1$ action, there is a partial prediction of the eye pattern which should follow. This results because the previously-activated layer IV neurons deliver pulses to the associated neurons in layer II which suffice to fire the latter.

To control this predictive action to some extent, predicting may be initiated by applying a distributed shower of random pulses to the neurons of layer IV by an external control: if the layer IV neurons are unable to fire on pulses from layer II or layer III above these random pulses would fire neurons already stimulated from either layer II or layer III which were also "facilitated" by previous firing.

As described so far, FIG. 18 is an adaptive correlator: if the layer IV neurons are so arranged as to grow new connections—e.g. by using electrolytic devices on the neurons—the network becomes a growing correlator. Growth of a neuron in this way is governed by the following rules:

(i) A neuron grows connections while its weight is low, i.e. firing a neuron inhibits its growth;

(ii) A growing connection avoids contact with all other connections except axonal or output connections of layer III neurons and if two equivalent connections are made to one neuron, one of them degenerates;

(iii) A new connection set up by growth degenerates if pulses do not pass through it to fire its "destination" neuron in layer IV.

The broken line with arrow head in FIG. 18 represents a growth connection, the arrow head showing the direction of the growth.

Figure 19:
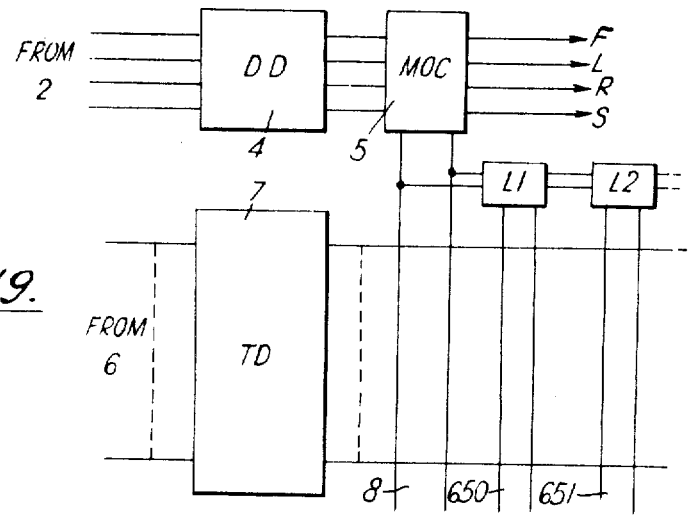

Action sequences and post-actions (FIG. 19)

Storing pattern-action pairs in the path memory may be an uneconomic use of the storage, and so it may be preferred, when a sequence of actions repeatedly follows a given pattern-action pair, to ensure that those subsequent actions, or post-actions, are directly associated with that pattern-action pairs row of the step path memory 6 and output memory 8. FIG. 19 shows how this can be done by making a relatively small addition to the system as shown in FIG. 17.

The path memory includes extra columns of cross-points indicated at 650, 651, for these post-actions. The storage locations for the post-actions are so arranged that for the first action a unit L1 is used to connect the first post-action from a row in use to the motor control unit 5, while L2 does the same job for the second post-action, and so on where there are three or more.

When a primary action, $A_0$, of a certain row is selected and performed by the unit 5, the subsequent actions $A_1$, $A_2$ . . . are compared with the first, second . . . post-actions $PA_1$, $PA_2$ . . . . Allocation of post-actions and variations of the weights thereof follow certain rules:

(i) If the $r^{th}$ action is the same as the $r^{th}$ post-action $PA_r$, the weight of the latter is increased;

(ii) If the $r^{th}$ action differs from a stored post-action $PA_r$ the weight thereof is decreased;

(iii) If the $(r-1)^{th}$ post-action location is empty, the $r^{th}$ post-action location remains or is made empty;

(iv) If the weight of $PA_{(r-1)}$ exceeds a given level $W_{max}$, and location $PA_r$ is empty, action $A_r$ is allocated to location $PA_r$, with an initial weight-setting;

(v) If the weight of $PA_r$ falls below another level $W_{min}$, location $PA_r$ is cleared;

(vi) Following on (iv), if the weight of $PA_{(r-1)}$ falls below $W_{max}$, location $PA_r$ is cleared;

(vii) If the weight of $PA_r$ exceeds $W_{max}$, unit 5 performs action $PA_r$ without consulting either of the detectors 4 or 7;

(viii) If post-actions $PA_1$, $PA_2$ . . . $PA_r$ are performed, but $PA_{(r+1)}$ is not performed due to its weight being less than $W_{max}$, the weights of the actions performed are adjusted according as the sequence probability after $PA_r$ was done is greater or less than it was before $A_0$, the primary action.

The cross-points used are assumed in this case to be such as described below, where individual weighting is possible.

If the primary action $A_0$ of the $g^{th}$ row is followed by the primary action $B_0$ of the $h^{th}$ row, and the latter by $C_0$ of row $i$, the sequence weights for the $g$–$h$ and $h$–$i$ transitions are increased to record the usefulness of these steps. At the same time, the first post-action PA, of $A_0$ is set to $B_0$ and its weights increased. When its weight reaches $W_{max}$ it assumes control from row $h$ by the performance of action $B_0$. If $A_0$ and $B_0$ continue to occur consequently, $PA_1$ continues to anticipate $B_0$, while the $g$–$h$ sequence weight is reduced and the connection may even be erased. This would release a row of the storage. During this erasure a new $g$–$i$ transition is established.

This post-action technique introduces storage economy at the cost of some circuit complexity.

Figure 20:
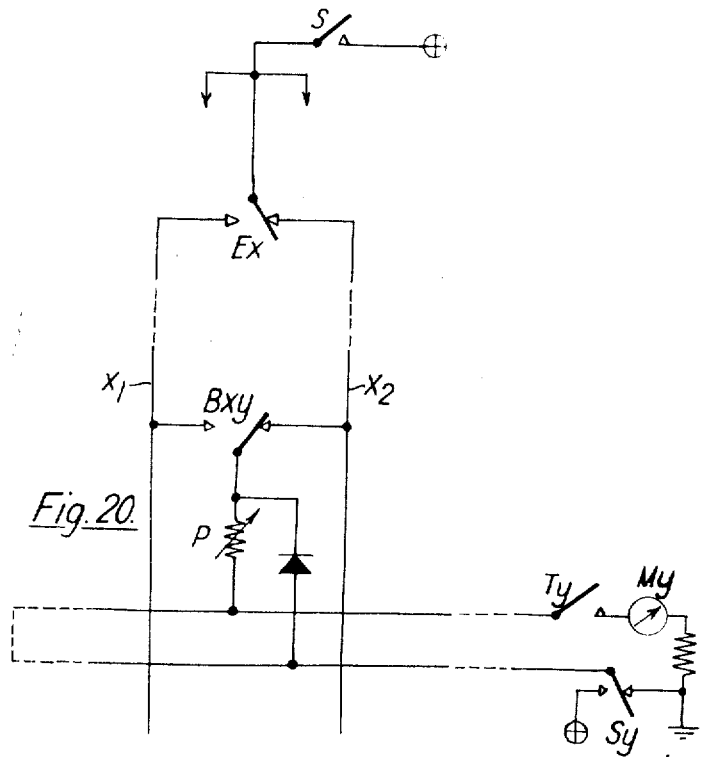

Path memory (see FIG. 20)

As already mentioned, the flexibility of operation of a learning machine is improved if individual weights can be associated with each element of an eye pattern as stored in the path memory 6. This facility would be of great value in process controllers where one particular element of the information on which the controller bases its action is highly critical.

FIG. 20 shows the cross-point between row $x$ and column $y$ of the path memory. As in the arrangement already described there are two column wires $x_1$ and $x_2$ and the eye contact $E_x$, controlled by one of the eye relays can connect a positive potential (controlled by switch S) to either $x_1$ or $x_2$, depending on whether the corresponding eye pattern element is binary 0 or binary 1. To store a pattern in the row, switches such as $B_{xy}$, one per cross-point, each of which corresponds to the two tubes in the earlier-described circuit, are each set to left for 0 and right for 1. Each cross-point has an adjustable resistor P whose setting is varied to alter the weight of that element. This adjustment can be effected either manually or automatically, or can use a combination of both methods, as an example, in a wheeled vehicle it might be considered desirable for the element or elements which represent the environment ahead of the machine to have higher weights than the others.

In a more simple arrangement, when a pattern is initially inserted into a row all of its weight resistors are set to equal values, so as to induct a maximum in the row current meter $M_y$, switches $T_y$ being closed, and the row's other switch $S_y$ is set to its left-hand state so that positive is applied to diodes such as D. The T switches are closed for all rows which are occupied by patterns.

When the memory holds a number of patterns, and switch S is closed with an eye pattern represented by the switches E offered to all rows, the currents flowing in the meter M, switches $S_y$ then being in the right-hand conditions, are a measure of the similarity between that eye pattern and the various stored patterns.

Sequence store

The cross-point structure of this, and indeed of other matrices, can also be similar to but simpler than that shown in FIG. 20, so is not described in detail. Thus the row and column wires are single with each cross-point formed of a diode and resistor in series with a contact closed for 1 and open for 0. The reward and pain columns are constructed in a manner generally similar to that used for the other matrix columns, with the difference that the pain column cross-points, via which the pain column is connectible to any of the rows do not include diodes, that the pain column is connected to negative, the reward column(s) being connected to positive.

It follows from the above that for each row of the sequence store which is in use a current flows whose value forms the row's number for detection purposes. This, of course, is similar to the technique used for the path memory. The switching provided for this store includes, as already indicated, means to indicate connections between different rows of the store, or rather, between patterns stored therein.

Flow diagram

Figure 21:
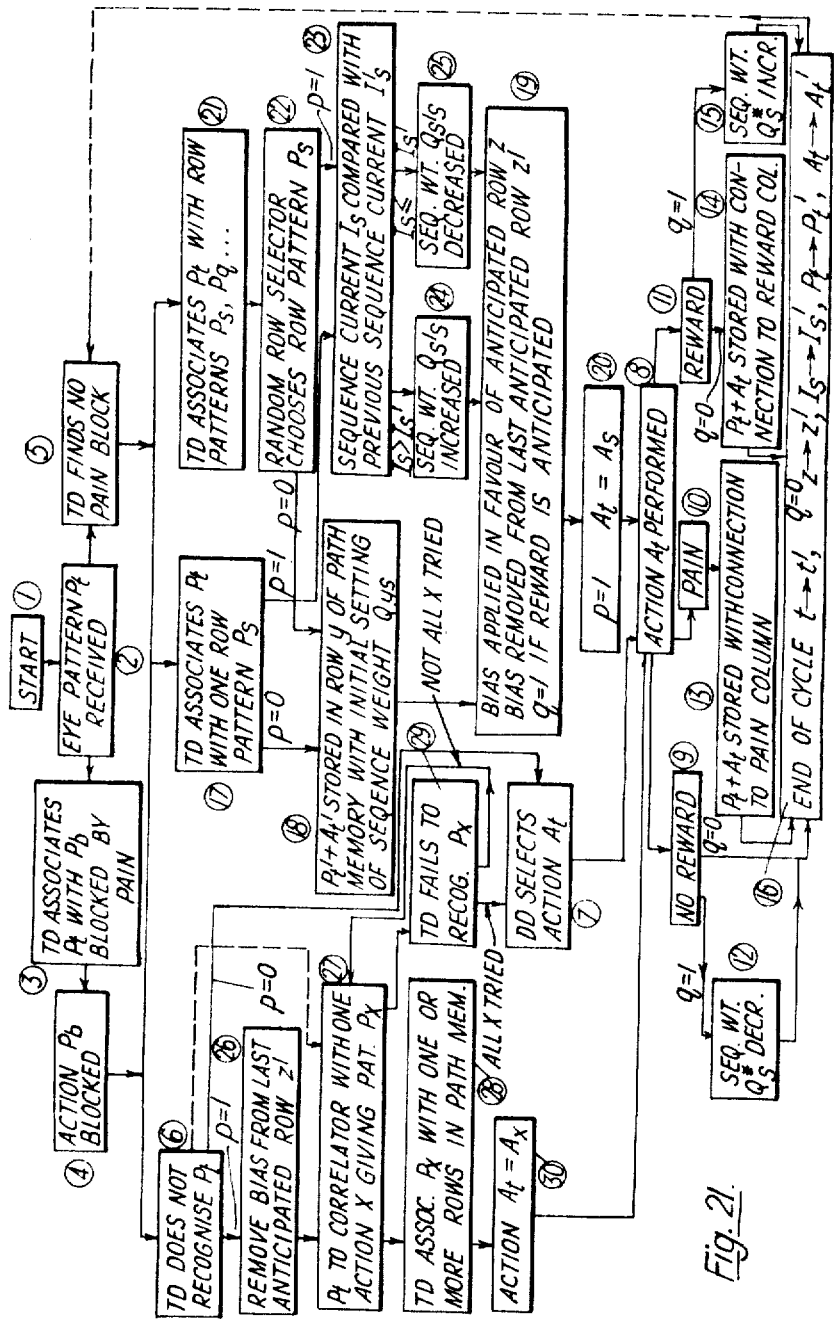

In considering the operation of the learning machines the flow diagram of FIG. 21, which indicates how the machine operates, will be found useful. Several operational cycles will be considered briefly.

(1) *Cycle 1.*—The machine is in the search mode, and the first eye pattern seen (block 2) is not associated by the threshold detector TD with a pain-blocked row (block 5), and is in fact not recognised (block 6). The dissimilarity detector DD chooses an action $A_t$ (block 7), which is performed (block 8) and no reward is obtained (block 9), so the cycle ends and the pattern $P_t$ and action $A_t$ are now designated $P_t^1$ and $A_t^1$.

(2) *Cycle 2.*—Back at the start—block 1—a new pattern $P_t$ is seen, which is not pain blocked (block 5) and is associated with $P_s$ in row $s$ of the path memory (block 17). Pattern-action pair $P_t^1$ and $A_t^1$ are stored in row $y$ of the memory and switch $S_{ys}$ closed to show that these two patterns follow each other. On measuring the sequence current it is found that this sequence leads to the expectation that the next eye pattern will be the same as the one in row $v$, which is thus biassed in anticipation. This, it will be recalled, facilitates selection of this row when the eye sees the eye pattern therein.

The machine is now operating in learned paths and the action $A_s$ of row $s$ determines the action $A_t$ to be done (blocks 20 and 8). There is no reward (block 9) and none anticipated, so we return to the start via block 16.

Figure 22:
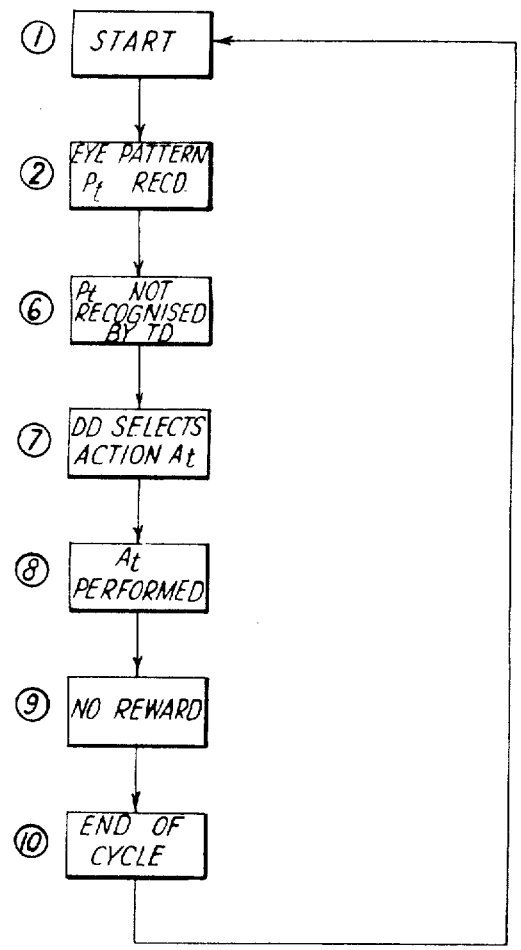
Figure 23:
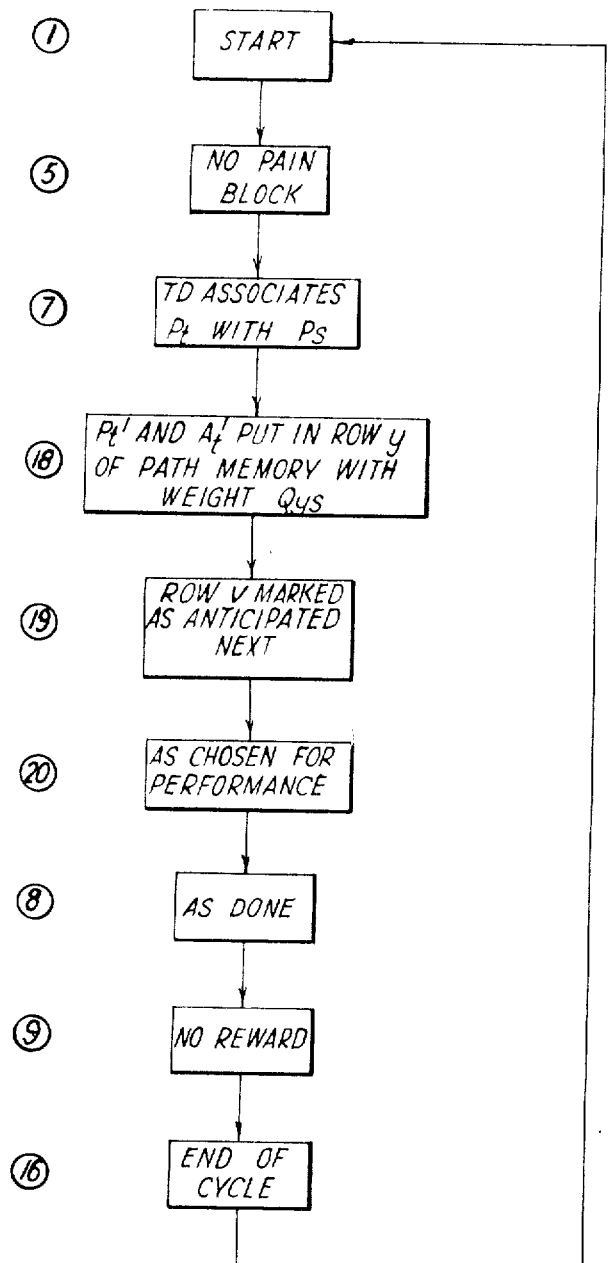

Although no further description thereof is included, further cycles of operation can be followed through with the aid of FIG. 21. FIGS. 22 and 23 show the cycles 1 and 2, above extracted.

If desired the machine can be allowed to pause at the end of each cycle and have an excursion into the internal mode described above.

Threshold of similarity

As the threshold of similarity on the basis of which TD operates is vital to the action of the machine, some considerations thereof in addition to what has gone before is useful. Seven ways are available for control of threshold, as follows:

(a) The threshold is held at a constant maximum value, so that the machine only recognises patterns if identical to ones in its memory. This is useful for following learned paths exactly but is somewhat inflexible.

(b) The threshold is held at a constant value less than the maximum. This allows the machine to, in effect, ignore random errors in the eye pattern, such as those due to noise.

(c) The threshold is lowered by a specified amount on certain occasions. An example of this already mentioned is the reduction of threshold from maximum when an eye pattern is not recognised. This in effect combines the features of (a) and (b).

(d) The threshold is increased when reward is found, which means that in the reward level the machine tends to follow more and more closely those paths leading to reward.

(e) The threshold decreases with time, or with the number of steps performed along learned paths. This gives the machine a "bias" in favour of short paths.

(f) The threshold is controlled by the sequence current.

(g) The threshold of one level in a heirarchical is controlled from a different level thereof.

Receptors and effectors

In the wheeled vehicle application of a learning machine the receptors are the photocells which form the eyes, and the effectors are the four possible motor outputs. In other arrangements the receptors and effectors will be chosen in accordance with the nature of the environment and the nature of the desired inter-action therewith. Where the machine is a general-purpose machine, i.e. are not constructed for a specific environment, it can be provided with different sets of receptors and effectors, with provision for interchange therebetween as the machine discovers by trial and error which sets are most suited to the jobs it is performing.

Figure 24:
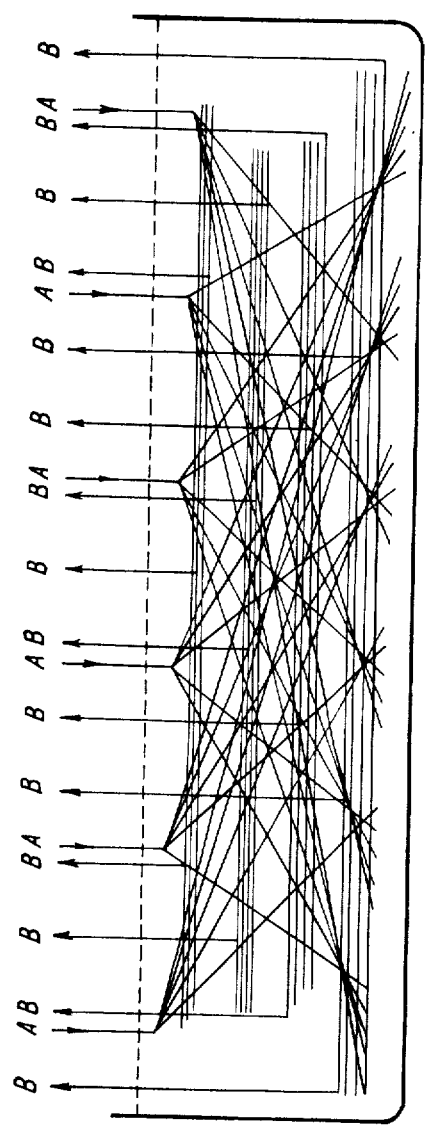

FIG. 24 illustrates how selection between receptors and effectors occurs is shown in FIG. 2 which represents an electrolytic tank filled with an electrolyte to a level indicated by the broken line. Each of a number of input wires A enters the electrolyte and then splays out into a number of wires extending through the tank and intermingling with, wires extending from others of the input wires. There are also output wires B which have the electrolyte and which also splay out below its surface, these wires intermingling among themselves and with the input wires. Direct contact between the immersed wires is avoided, as by covering their surfaces with separated spots or rings of insulating material.

These sets of wires are maintained by the application of a small voltage difference between input and output wires in a condition which encourages the growth of conductive metallic filaments between input wires and output wires, this tendency being to some extent inhibited, as by agitation. Thus a state of equilibrium is set up between growth and decay of the filaments.

When information from the receptors passes down the input wires as electrical currents, which can be pulses, it is transferred to output wires in a manner dependent on what filaments exist. The output wires extend to a processor, which processes the information formed by the output currents thus produced.

The information thus supplied may be rejected by the processor and any such rejection is fed back as an increase in the degenerative effect, while acceptance has the reverse effect.

This is an example of a system in which a learning machine can select, combine or re-arrange its receptors and effectors during operation.

Hierarchical arrays

Figure 25:
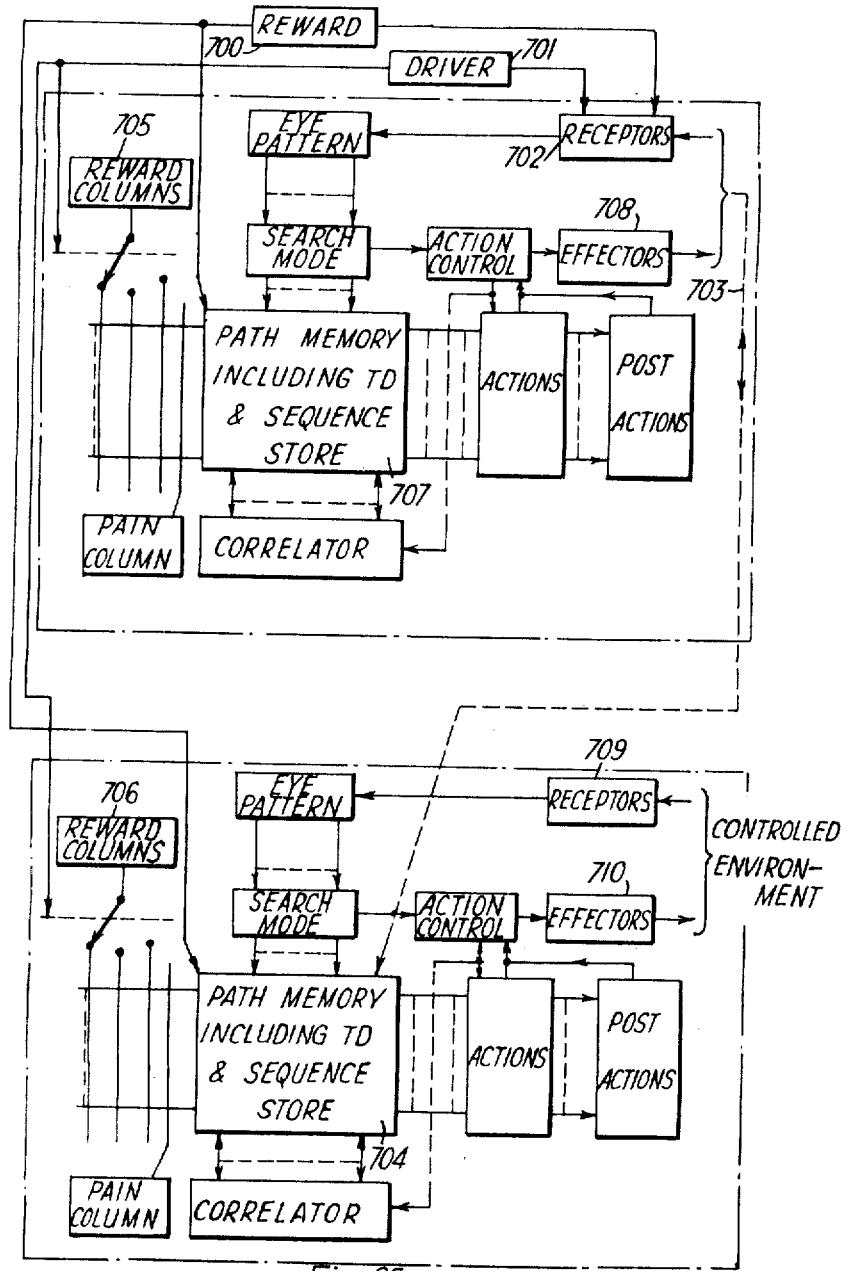

The possibility of using two or more learning machines interconnected in a "master" and "slave" manner has already been described, and FIG. 25 shows an arrangement of this nature in schematic form. Each learning machine is shown in greatly simplified form, but it is thought that the figure will be clear from the preceding description.

External control is effected by reward control 700 and drive control 701, common to both machines, of which the drive control serves to "tell" the interlinked machines what to do, and the reward control serves to "tell" them when they are doing what they have been "told." These two controls act directly on the receptors 702 of the master or upper level array, which also receive information from the lower level, as indicated by the connections shown at 703, from the path memory 704 of the slave or lower level array.

The drive control 701 also acts on the arrangement 705, 706 whereby reward columns are selected for use, it being assumed that the machines use different reward columns for different drives. The reward control 700, in addition to its influence on the upper level via receptors 702, acts on the path memories and associated circuitry 704 and 707. Thus the information received by the upper level consists of drives and rewards selected by the user of the machines, and information received via connections indicated at 703 from the lower level array. The outputs produced by the upper level are applied via the effectors 708 thereof, over connections represented by 703 to the lower level. Thus the upper level, in effect, "considers" what the lower level "tells" it, and either rewards it for satisfactory results or "instructs" it to alter its ways according to what should be attained.

The lower level receives information, as described above from the reward and drive controls 700 and 701 and also over connections 703 from the upper level. On the basis of the above information and of information which it receives from the controlled environment via its own receptors 709, the lower level determines what outputs it should generate. The latter are applied to the environment via the effectors 710, and are also communicated via the connections 703 to the upper level.

Thus it will be seen that a hierarchical interconnection exists between the two portions of FIG. 25.

Neural nets

In the earlier description a brief description was given of a correlator using electrical circuit analogues of nerve cells, i.e. neurons. Such principles can be extended to the whole or a major part of the machine.

What we claim is:

1. An electrical learning machine, which comprises output means which can generate any one of $n$ different output conditions each of which alters the machine's environment or its relation thereto, input means which obtains from said environment data words each relating thereto, a store with $n$ compartments each associated with a different one of said $n$ output conditions and each of which can contain a data word, a comparator for comparing a data word from said input means with the data words in said store and for selecting the stored word least like the word from said input means, control means responsive to the selection by said comparator of one of said recorded data words to cause said output means to generate the output condition corresponding to the compartment containing the selected word, and means for altering a word in said store after its selection so as to make it less unlike the word from said input device, whereby the machine can be caused to explore its environment.

2. An electrical learning machine as claimed in claim 1, and in which when said comparator finds that there are two or more identical data words in said store which are more unlike the word from said input means than the other words, selection therebetween is random, due to the chance conduction of one circuit element prior to one or more others.

3. An electrical learning machine as claimed in claim 2, and in which when said means for altering a stored word finds that the word to be altered differs from the word from the input means in two or more respects, choice between the respects in which alteration is to be effected is random.

4. An electrical learning machine as claimed in claim 3 and which comprises a second store having a number of compartments in each of which a word from said input means is stored when received said word being automatically erased from said second store on the reception of the next word from said input means, each said word being recorded with a code which identifies the output condition which that word caused to be generated and means for preventing said erasure if the word is one which requires to be retained in said second store retention being dependent upon maintaining a weighted value greater than zero.

5. An electrical learning machine as claimed in claim 4, in which said means for preventing erasure operates in response to a signal (hereinafter called a reward signal provided from an external operator console) representative of a desirable relation between the machine and its environment, the desirable relation being a relation which it is desired to learn, and in which a data word is also retained in said second store if the action performed as a result thereof was followed by a data word whose reception caused an action resulting in the reception of a reward signal.

6. An electrical learning machine as claimed in claim 5, and which comprises a second comparator associated with said second store which compares each data word from said input device with the data words in said second store and selects therefrom the word most closely resembling the data word from the input device, and means responsive to selection of a data word by said second comparator to cause said output means to generate the output condition associated with said selected data word, the controlling influence of said second comparator on said output means over-riding the influence thereon of said first comparator, whereby when said second store contains data words the machine can follow paths of actions dictated by said recorded data words.

7. An electrical learning machine as claimed in claim 6, and in which when two or more of the data words stored in said second store equally resemble the word from said input means, selection therebetween is on a random basis.

8. An electrical learning machine as claimed in claim 7, in which the reception of a reward signal in response to one of said output conditions biases the storage compartment of said second store containing the data word whose reception leads to that output condition, and in which said biasing weights that compartments' word so that the chance of its selection is increased.

9. An electrical learning machine as claimed in claim 8, and which comprises a third store having a number of compartments each of which is associated with a compartment of said second store, and means responsive to the retention of a word in said second store to record in said third store data representative of the relation between that word and previously received words and words expected to be subsequently received.

10. An electrical learning machine as claimed in claim 9, in which the weighting of a compartment is increased due to a bias favourable for selection when a word therein whose reception was expected occurs, or when a reward is received and in which the weighting of the compartment is reduced when a word whose reception was expected fails to materialise.

11. An electrical learning machine as claimed in claim 10, which comprises a fourth storage means in which a series of data recordings are made which together simulate the environment of the machine, control means which, if the comparator associated with said second store fails to recognise a word from the input means offers said word to said fourth store in conjunction with one of said output conditions, and means responsive to such offering to generate a new word which is supplied to said comparator for use thereby with said second store, the above sequence being repeated if necessary.

12. An electrical learning machine as claimed in claim 11, in which said fourth storage means comprises $n$ stores, one per output condition, different stores being used when words are offered to the store with different actions.

13. An electrical learning machine as claimed in claim 12, in which each input word is an $m$ digit binary code combination in which each said store is a co-ordinate matrix having $m$ rows of elements and $m$ columns of elements, in which said simulation of the environment is established.

14. An electrical learning machine as claimed in claim 13, in which said stores are connected in circuit one at a time, in which each input word is applied directly to the columns of store and via a delay to the rows of that store, the duration of the delay being such that a word reaches the rows of elements at the same time as the next input word reaches the columns of elements, in which each cross-point element is an analogue storage device, and in which when two input words are applied to the store, each said element is influenced by the conditions of a digit of each of said input words.

15. An electrical learning machine as claimed in claim 14, and in which the generation of said new word is effected as a result of comparing the input word with the contents of one of said stores.

16. An electrical learning machine as claimed in claim 15 and which comprises means whereby the operations associated with said fourth storage means can be performed successively without affecting said output means, such operation resembling thinking ahead.

17. An electrical learning machine as claimed in claim 16 and which comprises selection means for selecting one of a plurality of different objectives towards which the machine's efforts are directed, and means whereby a reward signal is generated if the machine attains its intended objective.

18. An electrical learning machine which comprises input means for collecting electrical signals representative of an environment in which the machine exists or of the relation of the machine to that environment, output means for generating output conditions each of which can influence the nature of said environment or the relation of the machine thereto, first control means for causing the machine to search the environment to acquire data representative of the nature thereof or of the relation between the machine and its environment, storage means in which such data may be retained, said storage means being capable of containing both data words representing the nature of said environment or the relation of the machine thereto and signals (hereinafter called reward signals) indicating that the operations of or due to said machine's output conditions are satisfactory, and second control means for causing the machine to follow paths of action indicated by the data in said storage means as being satisfactory, the machine switching from operation under control of said first control means when sufficient data therefor has been collected and switching from operation under control of said second control means to operation under control of said first control means when the operation under control of said first control means fails to lead to an expected result.

19. A learning machine as claimed in claim 1 in which the machine is included in a wheeled vehicle which collects data relating to its environment by a lamp of photocell system.

References Cited

A Magnetic Associative Memory, J. R. Kiseda et al., IBM Journal, 1961, pp. 106–110 and 113–121.

ROBERT C. BAILEY, *Primary Examiner.*

I. S. KAVRUKOV, *Assistant Examiner.*